United States Patent [19]
Tanigawa et al.

[11] Patent Number: 5,973,681
[45] Date of Patent: Oct. 26, 1999

[54] INTERACTIVE DATA COMMUNICATION SYSTEM WITH UNIDIRECTIONALLY TRANSMITTED BROADCAST WAVE

[75] Inventors: Hidekazu Tanigawa; Kazuo Okamura, both of Hirakata; Junichi Hirai, Suita; Yoshiyuki Miyabe, Osaka, all of Japan

[73] Assignee: Matsushita Electric Industrial Co., Ltd., Osaka, Japan

[21] Appl. No.: 08/867,344

[22] Filed: Jun. 2, 1997

[30] Foreign Application Priority Data

May 31, 1996 [JP] Japan ..................................... 8-138500

[51] Int. Cl.⁶ .............................. H04N 7/10; H04N 7/08; H04N 5/445; H04H 1/02
[52] U.S. Cl. ................................ 345/327; 348/6; 348/10; 348/473; 348/564; 455/4.1; 455/6.2
[58] Field of Search ................................ 345/327; 348/6, 348/10, 12, 13, 906, 469, 473, 476–479, 553, 556, 564, 565, 566; 455/3.1, 4.1, 4.2, 6.1, 6.2, 6.3

[56] References Cited

U.S. PATENT DOCUMENTS

| | | |
|---|---|---|
| 4,797,942 | 1/1989 | Burt . |
| 5,327,554 | 7/1994 | Palazzi, III et al. . |
| 5,355,480 | 10/1994 | Smith et al. . |
| 5,473,609 | 12/1995 | Chaney ................................ 348/906 |
| 5,515,106 | 5/1996 | Chaney et al. ...................... 348/906 |
| 5,539,479 | 7/1996 | Bertram . |
| 5,539,822 | 7/1996 | Lett . |
| 5,539,920 | 7/1996 | Menand et al. ...................... 455/5.1 |
| 5,650,826 | 7/1997 | Eitz .................................... 348/906 |
| 5,819,034 | 10/1998 | Joseph et al. ....................... 348/6.2 |

FOREIGN PATENT DOCUMENTS

WO 92 14341  8/1992  WIPO .

Primary Examiner—John W. Miller
Attorney, Agent, or Firm—Price Gess & Ubell

[57] ABSTRACT

A transmitting apparatus for an interactive communication system using a broadcast wave, which includes a first storage unit, a second storage unit, and a transmitting unit. The first storage unit stores a plurality of frames of image data. The second storage unit stores control information which shows links between said plurality of frames of image data stored in the first storage unit, and which indicates a combining of a supplementary design with the image data. These supplementary designs are stored by a receiving apparatus and are combined with the image represented by the image data. The transmitting unit repeatedly transmits a predetermined number of frames of image data together with corresponding control information.

32 Claims, 26 Drawing Sheets

FIG. 2

FILE LIST 200

| SERIAL NO. | ADDRESS | FILE NAME |
|---|---|---|
| 0001 | http://www.wbc.com/main | Report.html<br>Weather.gif<br>Weather.au |
| 0002 | http://www.wbc.com/sub1 | Tokyo.html |
| 0003 | http://www.wbc.com/sub1 | Osaka.html |
| ... | ... | ... |

FIG. 3

HTML DOCUMENT
301

311 — ⟨HTML⟩

312 — ⟨H1⟩ WEATHER REPORT ⟨/H1⟩

313 — ⟨CENTER⟩

314 — ⟨IMG SRC="Weather.gif"⟩

315 — ⟨/CENTER⟩

316 — ⟨P⟩ TOMORROW,THE WHOLE OF JAPAN WILL ENJOY

317 — SPRINGLIKE WEATHER ⟨/P⟩

318 — ⟨UL⟩

319 — ⟨LI⟩ ⟨A HREF="Tokyo.html"⟩ TOKYO ⟨/A⟩

320 — ⟨LI⟩ ⟨A HREF="Osaka.html"⟩ OSAKA ⟨/A⟩

321 — ⟨LI⟩ ⟨A HREF="Weather.au"⟩ AUDIO INFORMATION ⟨/A⟩

322 — ⟨/UL⟩

323 — ⟨/HTML⟩

Report.html

401 IMAGE INFORMATION

Weather. gif

HTML DOCUMENT 501

⟨HTML⟩

⟨H1⟩ TOKYO WEATHER ⟨/H1⟩

⟨UL⟩

⟨LI⟩ TOMORROW—FINE

⟨LI⟩ DAY AFTER TOMORROW—FINE

⟨/UL⟩

511 ⟨LI⟩  ⟨A HREF="Report.html"⟩ RETURN ⟨/A⟩

⟨/HTML⟩

Tokyo.html

FIG. 6

HTML DOCUMENT 601

```
<HTML>
<H1> OSAKA WEATHER </H1>
<UL>
<LI> TOMORROW-FINE
<LI> DAY AFTER TOMORROW-FINE
</UL>
<LI>  <A HREF="Report.html"> RETURN </A>
</HTML>
```

611

Osaka.html

FIG. 7

LINK INFORMATION TABLE 700

| | FORMAT |
|---|---|
| INDEX INFORMATION | ⟨INDEX=9999⟩ |
| HOT SPOT INFORMATION | ⟨HOTSPOT X=999, Y=999, GO_TO_PAGE(9999)⟩ |

701
702

("9" REPRESENTS A DECIMAL DIGIT)

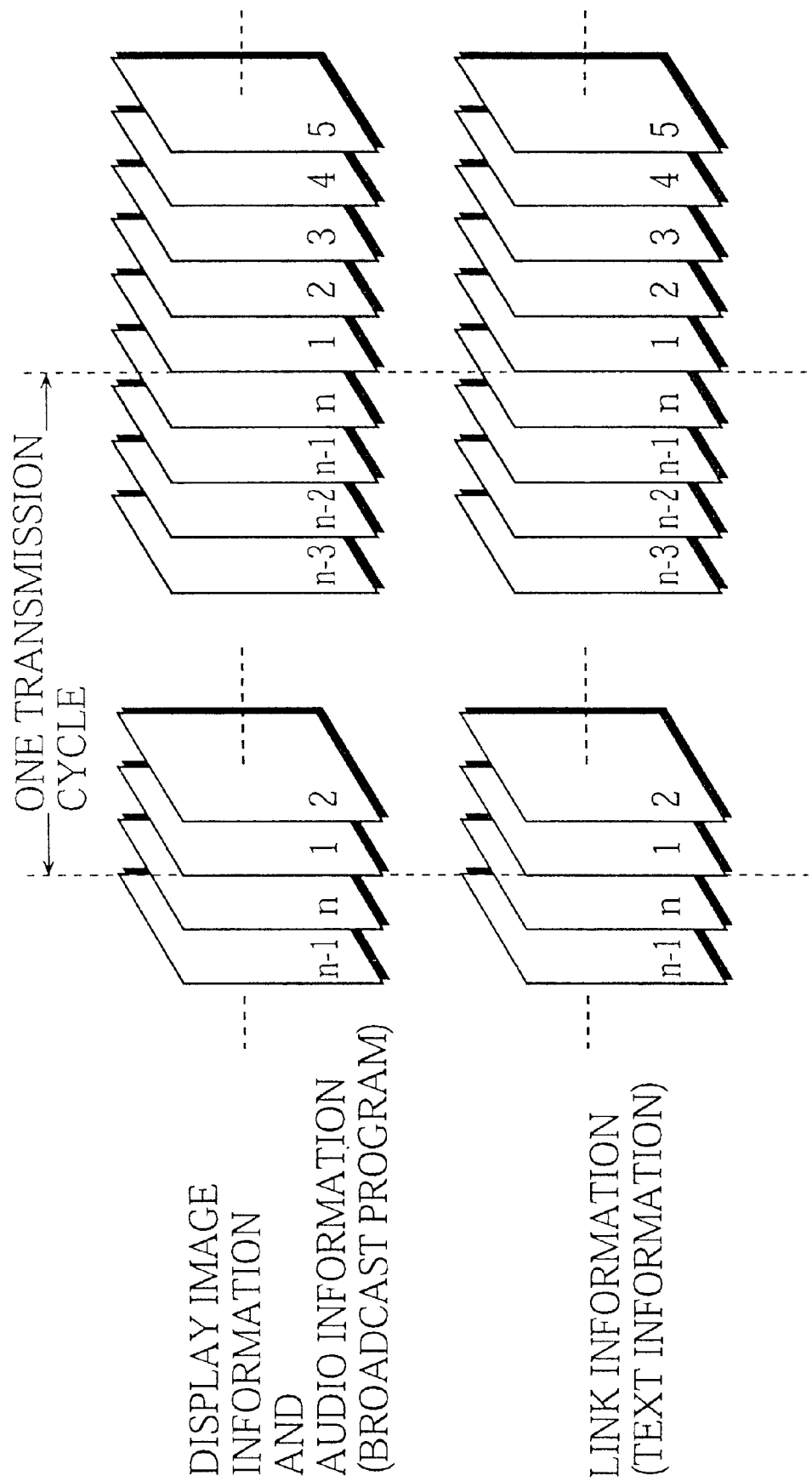

FIG. 16

| CURSOR NO. | DISPLAY POSITION(X,Y) |
|---|---|
| 1 | (100, 600) |
| 2 | (100, 700) |
| 3 | |
| 4 | |
| 5 | |

FIG. 17

DESIGN INFORMATION

| CURSOR NO. | SELECTED | NOT SELECTED |
|---|---|---|
| 1 | ① | ① |
| 2 | ② | ② |
| 3 | ③ | ③ |

FIG. 23

LINK INFORMATION TABLE 2300

| | FORMAT |
|---|---|
| INDEX INFORMATION | ⟨INDEX=9999⟩ |
| HOT SPOT INFORMATION | ⟨HOTSPOT X=999,Y=999,GO_TO_PAGE(9999)⟩ |
| TITLE INFORMATION | ⟨TITLE X=999,Y=999,L=999⟩ |

("9" REPRESENTS A DECIMAL DIGIT)

TRANSMISSION DATA 2400

NON-DISPLAYED AREA    FILE IDENTIFICATION NO.

0001

WEATHER REPORT

TOMORROW, THE WHOLE OF JAPAN WILL ENJOY
SPRINGLIKE WEATHER
· TOKYO
· OSAKA

801

0001

(AUDIO INFORMATION)

802

0001

2411 — ⟨INDEX=0001⟩
2412 — ⟨TITLE  X=020, Y=020, L=140⟩
2413 — ⟨HOTSPOT  X=020, Y=300, GO_TO_PAGE(0002)⟩
2414 — ⟨HOTSPOT  X=020, Y=320, GO_TO_PAGE(0003)⟩

2401

| TAG | DESIGN INFORMATION |
|---|---|
| HOTSPOT 1 (2601) | |
| HOTSPOT 2 (2602) | |
| TITLE (2603) | |

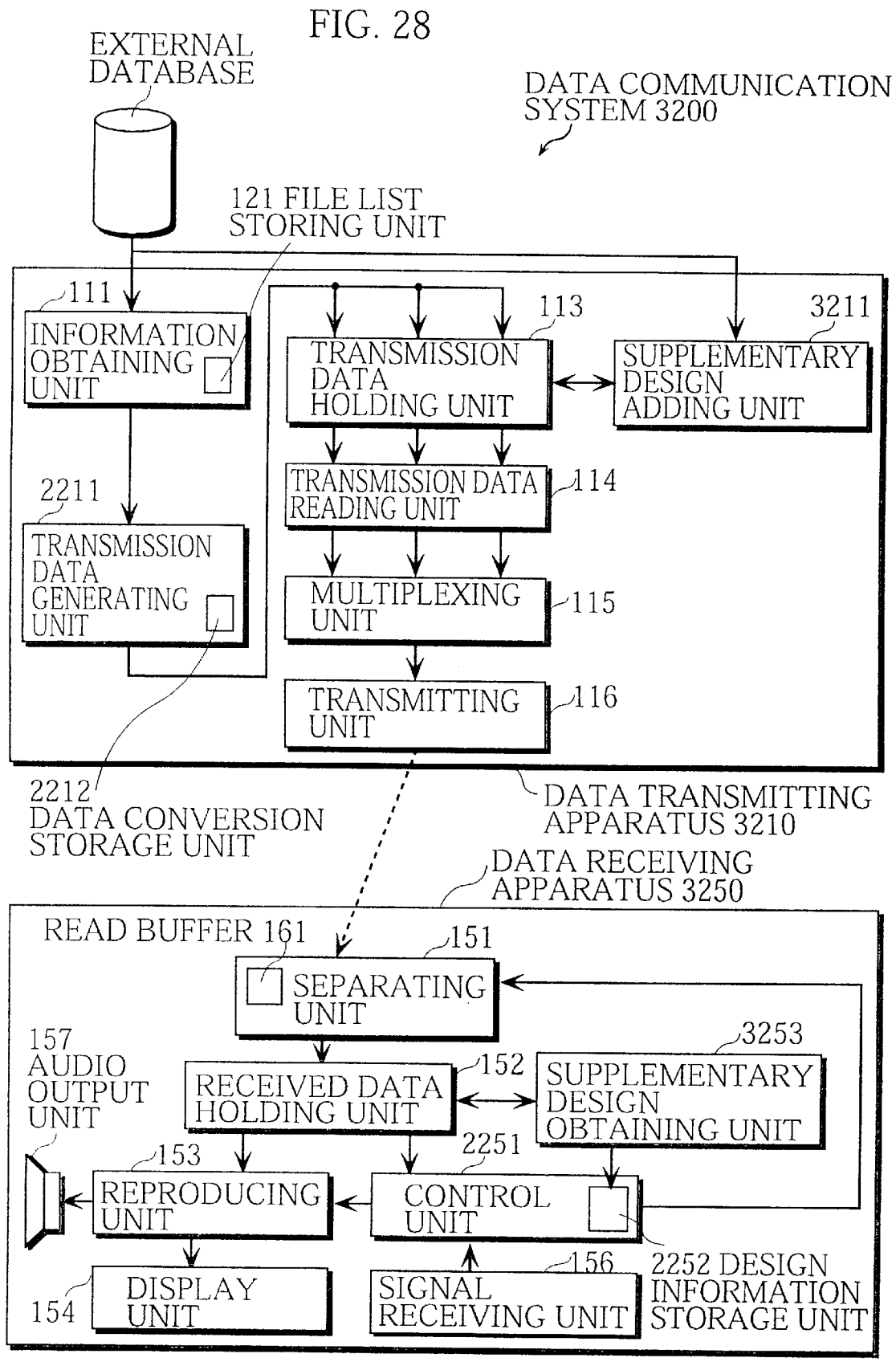

TRANSMISSION DATA 3400

NON-DISPLAYED AREA · FILE IDENTIFICATION NO.

0001

WEATHER REPORT

TOMORROW, THE WHOLE OF JAPAN WILL ENJOY SPRINGLIKE WEATHER
- TOKYO
- OSAKA

801

0001

(AUDIO INFORMATION)

802

0001

3411 ⟨INDEX=0001⟩
3412 ⟨TITLE X=020, Y=020, L=140⟩
3413 ⟨HOTSPOT X=020, Y=300, GO_TO_PAGE(0002)⟩
3414 ⟨HOTSPOT X=020, Y=320, GO_TO_PAGE(0003)⟩

3415

| TAG | DESIGN INFORMATION |
|---|---|
| HOTSPOT 1 | ✖ |
| HOTSPOT 2 | ✖ |
| TITLE | ⌐ ─ ─ ─ ─ ┐ |

3401

INTERACTIVE DATA COMMUNICATION SYSTEM WITH UNIDIRECTIONALLY TRANSMITTED BROADCAST WAVE

BACKGROUND OF THE INVENTION

(1) Field of the Invention

The present invention relates to a data communication system, and to a data transmitting apparatus and data receiving apparatus, where simulated bidirectional communication processing is performed between a data transmitting apparatus and a data receiving apparatus using one-way communication, such as a television (TV) broadcast.

(2) Description of the Prior Art

It is now possible to connect personal computers in the home to networks using a standard telephone line and so receive a great variety of information provided by servers around the world. The most representative example of such a network is the World Wide Web (WWW) on the Internet. WWW servers transmit a combination of image information and control information, which has the image information displayed within text information, to personal computers as the data for displaying a one-page image on the personal computer's screen. When such pages are made up of text information alone, only control information for displaying this text information is transmitted. This control information is written using HTML (HyperText Markup Language), with browser software executed by the personal computer decoding and executing the HTML code to display each page on the WWW which is downloaded by the user. Here, information indicating a link to another page can be attached to character strings and images in a page, so that when the user makes a selection operation for such a character string or image using a mouse, for example, the browser will access the WWW server that provides the indicated page and will obtain the information for displaying this new page. On obtaining this information, the browser will decode and execute its content to display the new page.

Japanese Laid-Open Patent Application 7-322226 (1995) discloses a method for multiplexing control information that can generate the kind of interactive display described above into a TV broadcast which is transmitted using a TV broadcast ground wave. In this method, the program transmitting apparatus multiplexes data, written in a language which resembles HTML for composing an interactive screen, into a program broadcast before transmitting. On receiving this broadcast, the program receiving apparatus interprets the composition of the interactive screen and combines basic display elements which have been stored inside its construction in accordance with the indicated composition to display the interactive screen.

The above method has a major drawback in that the control information is written in a language for indicating a variety of control operations which are performed for display, so that the receiving apparatus needs to interpret and execute these control operations one by one to perform display. Additionally, most high resolution images provided by WWW servers are compressed using complex techniques, so that when a receiving apparatus attempts to display such image information, it is usually necessary to perform decompression in addition to the processes for display in accordance with the control information. Since such complex processing is required, the load of the receiving apparatus is considerable, which greatly increases the cost of the necessary hardware for the receiving apparatus. This problem makes this communication method unsuitable for a TV broadcast communication system in which transmission is performed from a small number of transmitting apparatuses to a large number of receiving apparatuses.

SUMMARY OF THE INVENTION

In view of the above problems, it is a first object of the present invention to provide a transmitting apparatus, a receiving apparatus, a reception method, a medium storing a reception program, and a communication system where interactivity is achieved by simulated bidirectional communication between a data transmitting apparatus and a data receiving apparatus in a one-way communication system such as a TV broadcast system, without increasing the load of the data receiving apparatus.

A second object of the present invention is to have an image which emphasizes a specific part or the display image displayed by the receiving apparatus in addition to supplementary designs for a variety of buttons which make operations clearer and easier to understand for the user. Here, the user is able to customize these supplementary designs, the designs having a further benefit of reducing the amount of data transmitted to the receiving apparatus.

These objects can be achieved by a transmitting apparatus for an interactive communication system using a broadcast wave, including: a first storage unit for storing a plurality of frames of image data; a second storage unit for storing control information which shows links between the plurality of frames of image data stored in the first storage unit, and which indicates a combining of a supplementary design with the image data stored in the first storage unit, the supplementary design being stored by a receiving apparatus and being combined with an image represented by the image data: and a transmitting unit for repeatedly transmitting a predetermined number of frames of image data together with corresponding control information.

With the above construction, image data, control information corresponding to the image data, and information indicating the combining or the image data with supplementary designs are repeatedly transmitted. The receiving apparatus will definitely receive the information indicating the combining or supplementary designs and the linked image data indicated by the control information the next time such data is transmitted in the transmission cycle, so that interactive jumps to a user's desired image data can be performed one after the other. As a result, broadcast signals which are limited to communication in one direction can be used to achieve an interactiveness which for the user will resemble bidirectional communication. Also, having the receiving apparatus combine supplementary designs with the image data makes the system very easy to operate.

Here, the transmitting apparatus may include an obtaining unit for obtaining pieces of page information representing a page containing characters and images, the page information including link information to show a link is to another page, character information, and image information; a first producing unit for producing one frame of image data containing characters and images in accordance with the character information and image information included in a piece of page information; and a second producing unit for interpreting the link information included in the obtained page information and producing, for each frame of image data, control information including image link information about a link to another frame of image data and supplementary design combining information indicating a combining of a supplementary design with the frame of image data generated by the first producing unit, the supplementary design being stored by a receiving apparatus and being combined with an image represented by the image data.

With the above construction, page information received from an external source can be converted into image data, control information, and supplementary design information which indicates a combining of supplementary designs for each set of image data, these sets of data being suited to broadcasting Here, the obtaining unit may obtain the page information from the World Wide Web on the Internet.

With the above construction, the transmitting apparatus can convert HTML documents on WWW servers on the Internet into image data, control information, and supplementary design information which it then broadcasts. As a result, the transmitting apparatus can provide users with an interactive program which resembles "net surfing" on the Internet using only a TV broadcast wave.

Here, the determining unit may determine a headline as the specified image part, and the generating unit may generate supplementary design combining information which indicates a combining of the specific image part with a supplementary design for bold display.

With the above construction, the transmitting apparatus can detect the headline written in an HTML document on a WWW server on the Internet and can generate supplementary design combining information indicating a combining of the supplementary design at an image position of the headline. The receiving apparatus receives this supplementary design combining information and combines a supplementary design, which is made up of a frame which surrounds the title of the image data, with the image data to emphasize the title of the image data.

Here, the determining unit may determine one of a character and an image to which a link has been attached as the specific image part, and the generating unit may generate supplementary design combining information indicating a combining of supplementary design, which shows that a link to another frame of image data is attached, with the specified image part.

With the above construction, the transmitting apparatus can determine the characters and images in a HTML page which have a link to another image attached to them and can generate supplementary design combining information indicating a combining of these characters and images with a supplementary design. The receiving apparatus receives this supplementary design combining information and superimposes a supplementary design showing the attachment of a link to another image at a position in the image data of such linked character or image to emphasize the characters and images to which links to other image data have been attached.

Here, the second producing unit may include: a supplementary design storage unit for storing a supplementary design beforehand; and a supplementary design adding unit for reading a supplementary design from the supplementary design storage unit and for adding the read supplementary design to the stored control information.

With the above construction, the transmitting apparatus adds supplementary designs, which it already stores, to the control information, so that a receiving apparatus can receive this control information including supplementary designs from the transmitting apparatus, and can obtain the supplementary designs from the control information which it then stores. The receiving apparatus can then combine these received supplementary designs with image data, meaning that a variety of supplementary designs may be used by the receiving apparatus.

The objects of the present invention can also be achieved by a receiving apparatus for an interactive communication system using a broadcast wave, wherein the broadcast wave is produced by multiplexing a plurality of frames of image data, and control information which includes image link information for each frame of image data showing links with other frames or image data and supplementary design combining information indicating the combining of a supplementary design with the plurality of frames of image data, the broadcast wave being repeatedly transmitted, and the supplementary design being combined with an image of the image data, wherein the receiving apparatus includes: a separating unit for separating a frame of image data and corresponding control information from the broadcast wave; a supplementary design storage unit for storing at least one supplementary design; a supplementary design reading unit for reading a supplementary design from the supplementary design storage unit, based on the separated control information; a combining unit for combining the read supplementary design with the separated image data; a storage unit for storing the combined image data and separated control information; a reproducing unit for reproducing the stored image data to output an image signal; an operation unit for receiving an operation instruction from a user to switch image data; and a control unit for controlling the separating unit to separate another frame of image data designated by the control information stored in the storage unit according to the operation instruction.

With the above construction, the receiving apparatus receives the broadcast wave from the transmitting apparatus and separates one set of image data, reproduces it, and outputs it as an image signal in accordance with user operations to achieve a simulated interactive environment. The receiver apparatus will definitely receive the image data indicated by control information and the control information for combining the image data with supplementary designs the next time this information is broadcast in the repeated transmission, so that the user can interactively select the linked image data which is to be displayed next. As a result, what appears to the user as interactive display using bidirectional communication can be achieved using a TV broadcast wave which only allows communication in one direction. Also, while servers in a bidirectional communication system have a load which changes depending on the number of requests from receiving apparatuses, meaning that the response time taken for the switching of the display image by a receiver apparatus can greatly vary, in the present invention the transmitting apparatus has no ouch changing load and so has at fixed cycle for repeatedly broadcasting all of the image data. As a result, the receiving apparatus will always be able to switch the image data within a fixed response time, which at most will be the time taken by one transmission cycle. The control information received by the receiving apparatus includes information indicating a combining of a supplementary design with the image data, so that the supplementary design can be superimposed onto the image data to assist the user in making his/her operations.

Here, the classification may indicate a headline as the specific image part and the supplementary design specifying unit may specify a supplementary design which emphasizes the specific image part.

With the above construction, the receiving apparatus receives the supplementary design combining information, and combines the supplementary design, which is a frame which surrounds the title of the display image, with the image data to emphasize the title.

Here, the classification may indicate one of a character and image to which a link has been attached as the specific image part and the supplementary design specifying unit may specify a supplementary design which shows that the specific image part has an attached link to other image data.

With the above construction, the transmitting apparatus receives supplementary design combining information and combines the supplementary designs showing links to other image data at the positions of characters or images which are linked to other sets of image data, so that the characters or images which are linked to other sets of image data are emphasized in the display.

Here, the supplementary designs stored in the supplementary design storage unit which are used for showing that a link to other image data is attached may be composed of two types which respectively correspond to a selection and a non-selection state, the operation unit may receive a selection operation from the user for one of a character and an image to which a link is attached, the receiving apparatus may include a state storage unit for storing a selection or non-selection state in accordance with an instruction from the operation unit, and the supplementary design reading unit may read a supplementary design corresponding to a state stored in the state storage unit from the supplementary design storage unit.

With the above construction, the supplementary designs are of two types which respectively show a selection and a non-selection state, so that the receiving apparatus can change the supplementary designs to be combined with the image data depending on whether the corresponding item is selected or not by the user. This clarification of the display assists the user in making his/her operations.

Here, the control information received from a transmitting apparatus may further include a supplementary design, and the receiving apparatus may further comprise a supplementary design recording unit for recording a supplementary design included in the separated control information in the supplementary design storage unit.

With the above construction, the receiving apparatus receives control information including supplementary designs from the transmitting apparatus, obtains the supplementary designs from the control information, and stores them. The receiving apparatus then uses the stored supplementary designs when combining supplementary designs with the image data, so that a variety of supplementary designs can be used by the receiving apparatus.

Here, the supplementary design storage unit may include a plurality of supplementary designs, the receiving apparatus may further include a supplementary design selecting unit for selecting one supplementary design from the plurality of supplementary designs stored by the supplementary design storage unit, in accordance with a user operation, and the supplementary design reading unit may read the selected supplementary design.

With the above construction, the user can select his/her desired supplementary designs.

The above objects can also be achieved by a receiving method used in a receiving apparatus for an interactive communication system using a broadcast wave produced by multiplexing a plurality of frames of image data and control information including link information showing a link to another of the plurality of frames of image data and supplementary design combining information for each frame of image data indicating a combining of a supplementary design and the image data, the supplementary design being combined with an image represented by the image data, the receiving method including: a separating step for separating a frame of image data and corresponding control information from the broadcast wave; a supplementary design reading step for reading a supplementary design stored in a memory; a combining step for combining the read supplementary design and the image data; a storage step for storing the combined image data and the separated control information in a memory; a reproducing step for reproducing the image data stored in the memory to output an image signal; a operation step for receiving a user operation instruction to switch image data; a determining step for determining image data indicated by the control information stored in a memory according to the operation instruction; and a second separating step for separating the determined image data and corresponding control information from the broadcast wave.

The above object can also be achieved by a communication system which includes the transmitting apparatus and receiving apparatus described above.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows an example file list 200 stored in the file list storing unit 121;

FIG. 3 shows the HTML document 301 "Report.html" which is the first page of a home page provided by a WWW server;

FIG. 6 shows the HTML document 601 "Osaka.html" which is the third page of the home page;

FIG. 7 shows an example of the link information table 700 stored in the data conversion table storing unit 122;

FIG. 11A shows the transmission method for used by the transmitting unit 116 for transmitting the transmission data;

FIG. 16 shows an example of the cursor design correspondence table which the control unit 155 generates to control the display position of the cursor design;

FIG. 17 shows an example of the design information stored by the control unit 155;

FIG. 23 shows an example of the link information table which is the stored content of the data conversion table storing unit in the second embodiment;

FIG. 28 is a block diagram showing the construction of the data communication system of the third embodiment of the present invention.

DESCRIPTION OF THE PREFERRED EMBODIMENTS

First Embodiment

Figure 1:
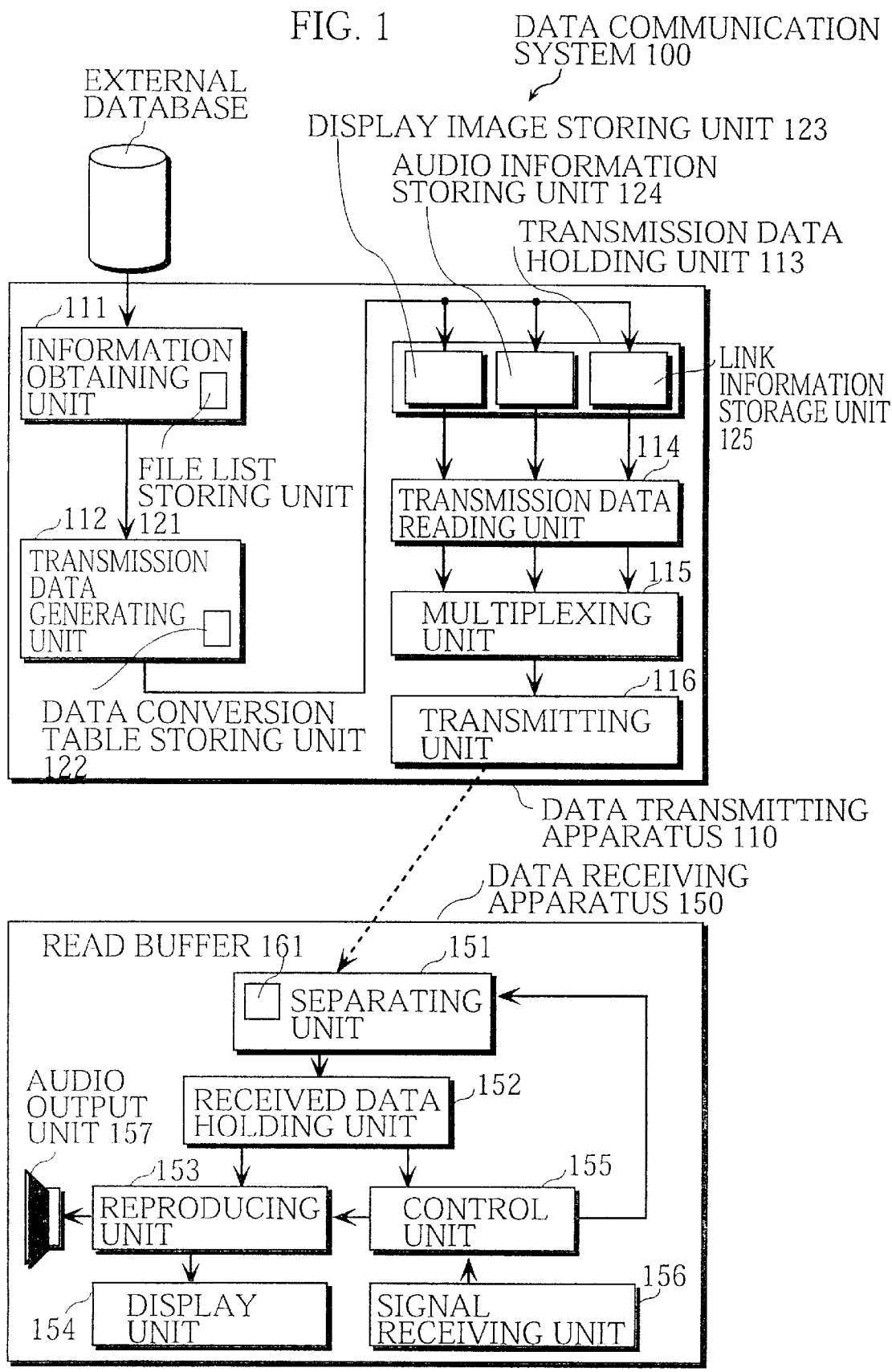
FIG. 1 is a block diagram showing the structure of the data communication system 100 of the first embodiment of the present invention.

FIG. 1 is a block diagram showing the construction of the data communication system 100 which is described in the is present embodiment. This data communication system 100 is composed of a data transmitting apparatus 110 and a plurality of data receiving apparatuses 150.

The data transmitting apparatus 110 includes an information obtaining unit 111, a transmission data generating unit 112, a transmission data holding unit 113, a transmission data reading unit 114, a multiplexing unit 115, and a transmitting unit 116

Each data receiving apparatus 150 includes a separating unit 151, a received data holding unit 152, a reproducing unit 153, a display unit 154, a control unit 155, a signal receiving unit 156, and an audio output unit 157.

Construction of the Information Obtaining Unit 111

The information obtaining unit 111 includes a file list storing unit 121 and a buffer (not-illustrated) which holds information obtained from an external database, such as a WWW server. The file list storing unit 121 stores a file list 200 in which the file names of files that are to be obtained by the information obtaining unit 111 and the addresses of these files are stored corresponding to serial numbers which show the order in which the files are to be obtained.

FIG. 2 shows an example of the file list 200 stored in the file list storing unit 121. In the tile names given in this list, the extension "html" indicates that a file is an HTML document, the extension "gif" indicates that a file is an image which has been compressed according to GIF (Graphics Interchange Format), and the extension "au" indicates that a file is audio information in AU format.

This file list 200 shown in FIG. 2 shows the case when the information obtaining unit 111 is connected to the Internet and obtains information from WWW servers. In this example, the rile list 200 is a table in which the URL (Uniform Resource Locator) of a directory on a WWW server is stored in the address column 202 corresponding to each number in the serial number column 201. In the present example, each page in a home page provided by a WWW server can be composed of an HTML document and image files and audio files whose file names are indicated by the HTML document. As a result, the file name of the HTML document for each page is grouped together with the file names of the accompanying image information files and audio files in the file name column 203 of the file list 200.

It should be noted that there can be cases when the address and file names stored in file list storing unit 121 for each serial number in the file list do not need to be recorded separately, so that they may instead be represented using a single URL. It is also possible for files to be obtained not from a WWW server, but from an external database. In this case, the address of the file is expressed as the address of a device in the external database and the file is expressed by a file address in the database.

The information obtaining unit 111 reads a URL and the file names which are to be obtained from the URL from the file list storing unit 121 in ascending order of the serial numbers in column 201. It then accesses the WWW server indicated by the URL to obtain the indicated files. The information obtaining unit 111 assigns file names to the obtained files and stores the files in the buffer.

Examples of Files

The files obtained by the information obtaining unit 111 are described below, with reference to FIGS. 3, 4, 5, and 6.

FIG. 3 shows the HTML document 301 "Report.html" which is the first page of a home page provided by a WWW server. The notation 'HTML document 301 "Report.html"' indicates the file of HTML document 301 whose file name is "Report.html."

In HTML documents, character strings written inside "< >" brackets are called tags. These tags represent control codes and are used in pairs written as "<character string>" and "</character string>". The control codes in tags indicate the execution of a corresponding control operation.

Tags "<HTML>" on line 311 and "</HTML>" on line 323 in FIG. 3 indicate that the character strings between these tags form a single HTML document 301.

Tags "<H1>" and "</H1>" on line 312 indicate that the character string "WEATHER REPORT" between these tags is the headline of this document.

Tags "<CENTER>" on line 313 and "</CENTER>" on line 315 indicate that the part of the document expressed by the character strings between these tags should be centered.

Figures 4, 5:
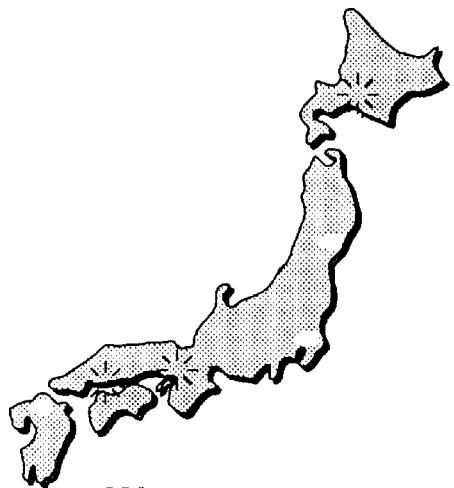
FIG. 4 shows the image information 401 "Weather.gif" which is an image displayed on the first page of the home page.
FIG. 5 shows the HTML document 501 "Tokyo.html" which is the second page of the home page.

'<IMG SRC="Weather.gif">' on line 314 indicates that the image information 401 "Weather.gif" shown in FIG. 4 is to be displayed in the document. Here, "SRC=" is an attribute of tag "<IMG>" and indicates an image information file. The attribute content of "SRC=" is "Weather.gif", indicating a file name.

FIG. 4 shows the image information 401 "Weather.gif" which is an image displayed on the first page of the home page.

As shown in FIG. 4, the image information 401 stored in image information file "Weather.gif" is a map of Japan which includes weather information.

Tags "<P>" on line 316 and "</P>" on line 317 indicate that the character string "TOMORROW, THE WHOLE OF JAPAN WILL ENJOY SPRINGLIKE WEATHER" between these tags is a single paragraph.

Tags "<UL>" on line 318 and "</UL>" on line 322 indicate that the display items expressed by the character strings between these tags are displayed as an itemized list without serial numbers.

Each of the tags "<L1>" on lines 319 and 320 indicates that the character string between this tag and the next "<L1>" or "</UL>" forms an item in the itemized list.

'<A HREF="Tokyo.html"> TOKYO </A>' on line 319 of FIG. 3 indicates that the character string "TOKYO" is linked to the HTML document 501 "Tokyo.html" which is shown in FIG. 5. Here, character strings or images which are linked to other files, such as this character string TOKYO", are called hot spots or anchor points. As one example, if a user uses the mouse to select the hot spot "TOKYO" which displayed on a computer monitor by a browser, the HTML document 501 "Tokyo.html" will be read by the browser and is displayed on the screen. Here, the attribute of tag "<A>", "HREF=", represents a link destination, and the attribute content of "HREF=", in this case "Tokyo.html", indicates a file name for the link destination file.

'<A HREF="Osaka.html"> OSAKA </A>' on line 320 of FIG. 3 indicates that the character string "OSAKA" is linked to the HTML document 601 "Osaka.html" which is shown in FIG. 6. Accordingly, this character string "OSAKA" is also a hot spot. If hot spot "OSAKA" is selected, HTML document 601 "Osaka.html" will be displayed on the screen.

'<A HREF="Weather.au"> AUDIO INFORMATION </A>' on line 321 of FIG. 3 indicates that the character string "AUDIO INFORMATION" is linked to the audio file "Weather.au.", making it another hot spot. If the hot spot "AUDIO INFORMATION" in selected, the audio file "Weather.au." will be reproduced.

FIG. 5 shows the HTML document 501 "Tokyo.html" which is the second page of the home page. The tags included in the HTML document 501 have already been explained, so that the following explanation will only deal with the links to other pages.

'<A HREF="Report.html"> RETURN </A>' on line 511 of FIG. 5 indicates that the character string "RETURN" is linked to the HTML document 301 "Report.html" which is shown in FIG.3.

FIG. 6 shows the HTML document 601 "Osaka.html" which is the third page of the home page.

'<A HREF="Report.html">' RETURN </A> on line 611 of FIG. 6 indicates that the character string "RETURN" is linked to the HTML document 301 "Report.html" which is shown in FIG. 3.

The information obtaining unit 111 may obtain all the files listed in the file list 200 in order and store all of the obtained files in its buffer. Alternatively, the information obtaining unit 111 may obtain the listed files in units of one page and store the obtained files in the buffer. In this latter case, the files for a next page are only obtained after the processing of a current page has been completed by the transmission data generating unit 112.

Construction of Transmission Data Generating Unit 112

The transmission data generating unit 112 includes a data conversion table storing unit 122 and a storage area (not shown in the drawings) which is used as the work area for generating transmission data. The data conversion table storing unit 122 includes a tag table, font files, and a link information table. The tag table is a list of control operations for every available HTML tag which each has its own flag The font files each include character fonts for TV display which are classified for different purposes. The link information table is a table which expresses the link information for hot spots in a format recognized by the data communication system 100. The work area is composed of a file storage area, a tag storage area, a character string storage area, and a flag storage area. The file storage area stores one HTML document file. The tag storage area stores the character strings which are written inside the "< >" brackets of each tag. The character string storage area stores character strings other than the ones between the "< >" brackets. The flag storage area is an area where flags which are used for controlling the generation of display image information for one frame of image data are set. The character strings stored in the tag storage area and the character string storage area are deleted when the control operations corresponding to the tags (flags) have been completed. If a plurality of flags are present in the flag storage area, the flags are set in ascending order and are reset in descending order.

FIG. 7 shows an example or the link information table 700 stored in the data conversion table storing unit 122, where the number, such as "9", are decimal values.

As shown in FIG. 7, the link information stored in the link information table 700 is composed of index information 701 and hot spot information 702.

Index information 701 is composed of an information identification part "INDEX=" for identifying the information as index information and a file identification number expressed as a four-figure decimal value. This file identification number is the identification number of a transmission data file which includes the current piece of index information 701

Hot spot information 702 is composed of an information identification part "HOTSPOT=" for identifying the information as hot spot information, X-Y coordinates "X=999, Y-999", for indicating a cursor position in the current display screen, an instruction "GO_TO_PAGE" which corresponds to the cursor position given by these coordinates, and a four-figure decimal variable showing the identification number of the transmission file linked to this cursor position.

The transmission data generating unit 112 treats one set of the display image information to be generated along with the accompanying audio information and link information as a single transmission data file, based on one HTML document. Here, the transmission data generating unit 112 establishes a storage area in each or the display image information storing unit 123, the audio information storing unit 124, and the link information storing unit 125 which are provided in the transmission data holding unit 113 (described later) so that the display image information, audio information, and link information to be included in one transmission data file are interrelatedly stored Hereinafter, the storage areas in the display image information storing unit 123, the audio information storing unit 124, and the link information storing unit 125 are respectively called the display image information storage area, the audio information storage area, and the link information storage area.

The transmission data generating unit 112 assigns a same identification number to the display image information storage area, the audio information storage area, and the link information storage area used for storing the corresponding kinds of information in a same transmission data file. Here, the transmission data generating unit 112 manages the audio information and link information in a same transmission data file as separate files which are given the same identification number. This identification number may correspond to the serial number in column 201 of the file list, which in turn corresponds to the file names of the present files which are given in column 203.

The transmission data generating unit 112 fetches an unprocessed HTML document file which has been obtained by information obtaining unit 111 from the buffer in the information obtaining unit 111 in accordance with the serial number 201 in the file list 200. The transmission data generating unit 112 then writes the file into the file storage area of the work area, in addition to generating the index information in accordance with the format of the index information 701 of the link information table 700. This generated index information is then stored at the front of the link information storage area in the transmission data holding unit 113.

The transmission data generating unit 112 reads the tags in order from the start of the HTML document and interprets the tags by looking each tag up in the tag table to find the corresponding control operations. This interpretation of control operation is performed by writing a character string detected after a tag start sign "<" one character at a time into the tag storage area provided in the work area until a tag end sign ">" is detected. The transmission data generating unit 112 then matches the character string in the tag storage area with a tag written in the tag table.

For tags which are not "<A>", "<IMG>", or "<character string preceded by '/>", the transmission data generating unit 112 sets a flag showing the interpreted control operation in the flag storage area provided in the work area and stores the character strings between the start tag "< >" and the corresponding end tag "</>" into the character string storage area in the work area so as to correspond to the set flag. The storage of character strings between a pair of corresponding tags is performed in the same way as the storage of the character strings included inside the tags themselves. The transmission data generating unit 112 converts the character strings in the character string storage area into text image using the fonts in one of the font files and arranges the text image in accordance with the control operation represented by the current flag to generate display image information. This generated display image information is then added to the display image information storage area provided in the transmission data holding unit 113. Here, when a start tag "<character string>" is followed, not by a character string, but by another start tag "<another character string>", a flag is first set for the former tag in the flag storage area, before the processing is performed for the control operation indicated by the latter tag.

If the read tag is "<ING>", the transmission data generating unit 112 fetches the image information file with the file name specified by the attribute "SRC=" from the buffer of the information obtaining unit 111, and decompresses the image information file under the format specified by the file name extension to convert the format of the image into an appropriate image data format, such as bitmap data or graphics data.

If, for example, the file name extension is ".gif", the transmission data generating unit 112 decompresses the image information file under GIF to convert the image information file into the appropriate format. If a preceding flag is set for a control operation to be performed on the converted image, the converted image is arranged in accordance with this control operation to generate display image information, otherwise the display image information is generated with the converted image being arranged in accordance with an initial setting. This generated display image information is then added to the display image information storage area.

If the read tag is "<A>", the transmission data generating unit 112 checks to see if the "link destination file" specified by attribute "HREF-" of "<A>" is an audio file which has a file name extension, such as "au", which indicates audio information. If the link destination file is an audio file, the transmission data generating unit 112 fetches the audio file from the buffer of the information obtaining unit 111 and converts the audio information into audio data of a predetermined format, before storing it in the audio information storage area.

If the link destination file is not an audio file, the transmission data generating unit 112 generates a text image for the character string between tags <A>and </A>, and arranged the text image at a display position indicated by a preceding flag, or alternatively at a display position specified by an initial setting, with a space being reserved for displaying a cursor. By doing so, the transmission data generating unit 112 generates display image information which is then added to the display image information storage area provided in the transmission data holding unit 113. The transmission data generating unit 112 then calculates the X-Y coordinates for the space reserved for the cursor display position and refers to the hot spot information 702 in the link information table 700 to generate hot spot information from the calculated X-Y coordinates and the "link destination file name" specified by the attribute "RREF=" of tag "<A>". In doing so, the transmission data generating unit 112 refers to the file list 200 and finds the serial number 201 corresponding to the file name in column 203 which in turn corresponds to the link destination file name of tag "<A>", before writing this serial number 201 into the hot spot information as the file identification number. If the link destination file name is not present in the file list 200, the transmission data generating unit 112 writes the file name of the current file into the hot spot information. After doing so, the transmission data generating unit 112 adds the generated hot spot information to the link information storage area provided in the transmission data holding unit 113.

After completing all the above processes for an HTML document, the transmission data generating unit 112 writes a graphic representation of the identification number of the display image information area at a predetermined position in the non-displayed area or the display image information stored in the display image information area. In the present embodiment, the identification number has been described as being a four-figure decimal value, although the number of decimal digits is not limited to four. The identification number may alternatively be represented in binary notation, as a combination of numerals, characters and symbols, as a graphical figure, as a bar code, or even as a file name. Here, the audio information stored in the audio information storage area and the link information stored in the link information storage area are also appended with the identification numbers of the corresponding storage areas, in the same way as with standard digital data files.

Through the processes described above, the transmission data generating unit 112 generates a first, second, and third page of transmission data 800, 900, and 1000, which are respectively the first, second, and third pages of the home page provided by the WWW server, from the HTML document 301, the audio information not shown in the drawings, the image information 401, the HTML document 501, and the HTML document 601.

Transmission Data Generated by the Transmission Data Generating Unit 112

Figure 8A:
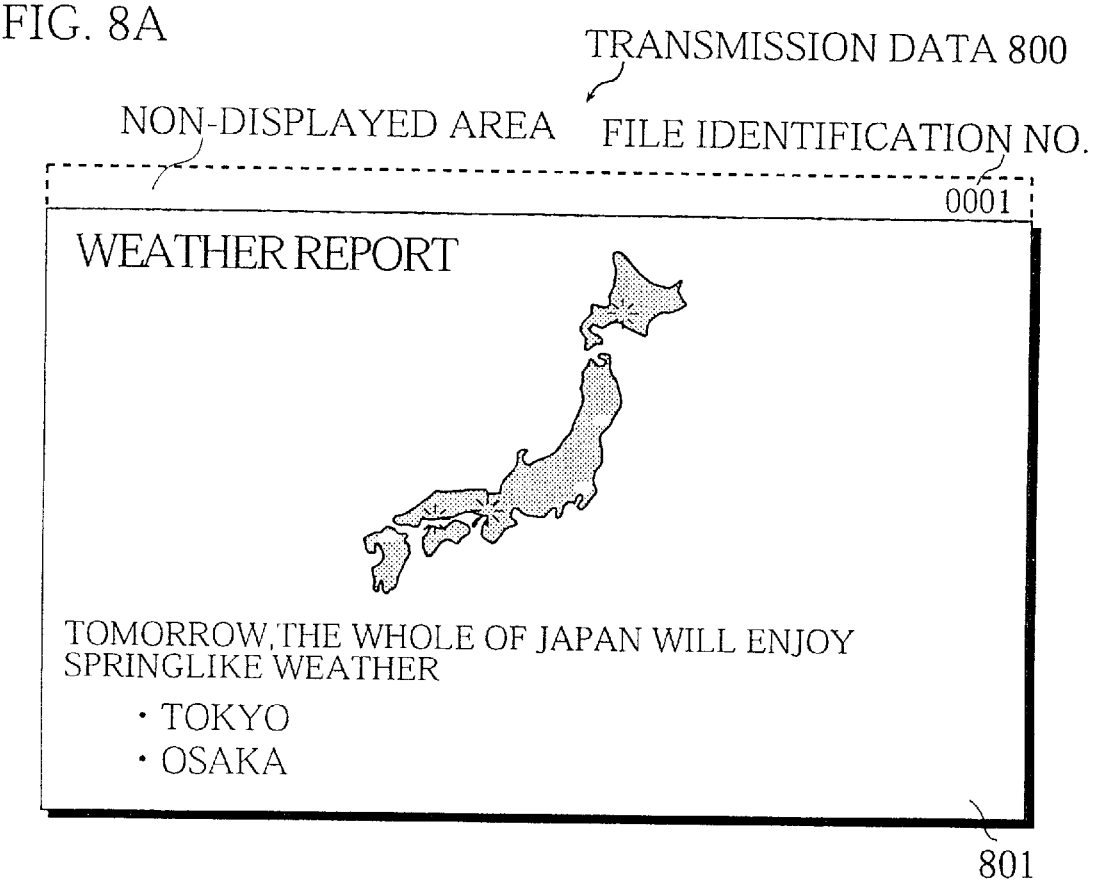
FIGS. 8A to 8C show transmission data 800 for the first page of the WWW home page generated from the HTML document 301, audio information "Weather.au", and the image information 401.
Figure 8B:
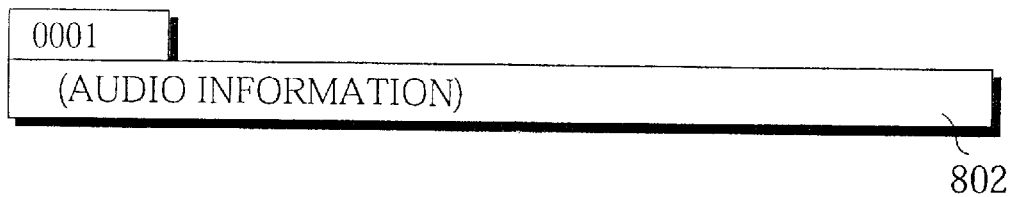
Figure 8C:
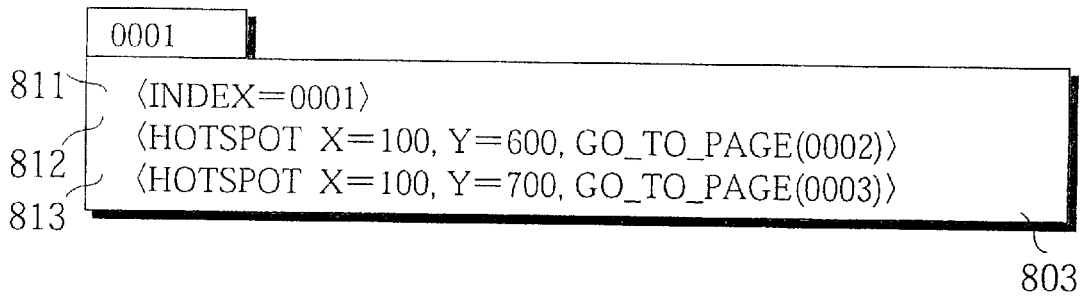
Figure 9A:
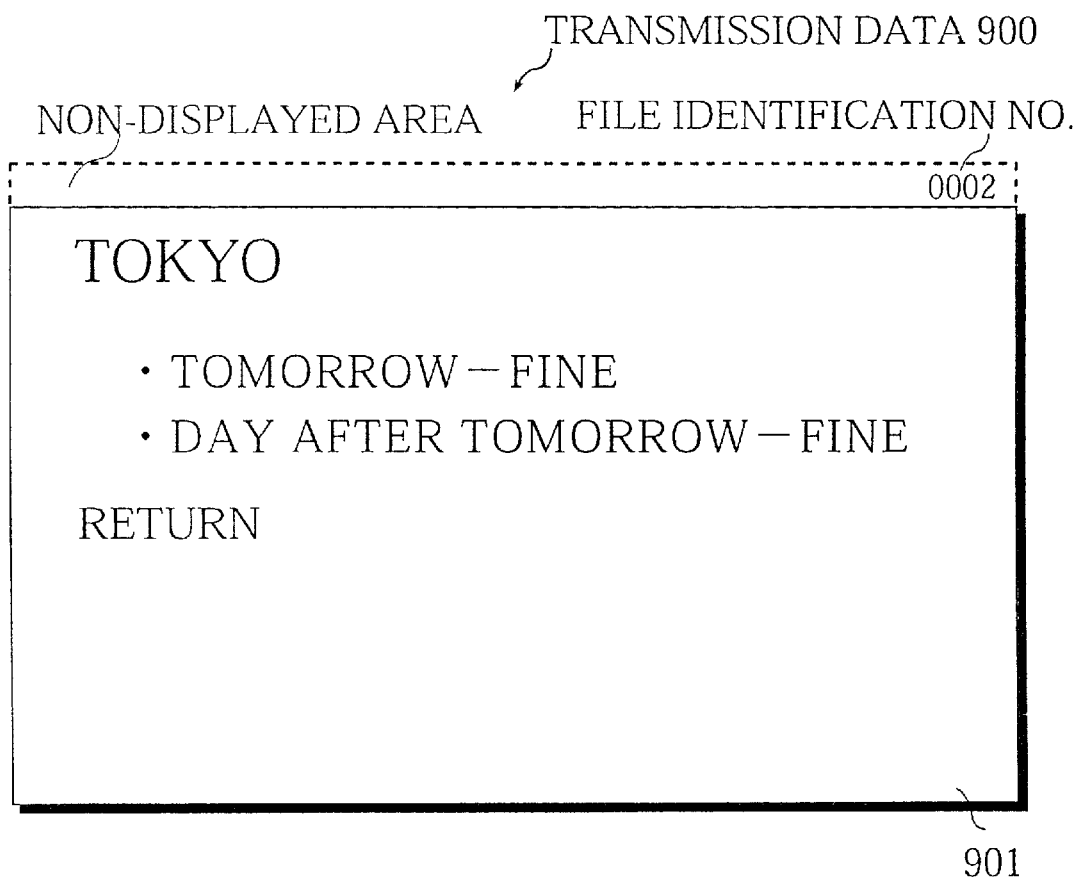
FIGS. 9A and 9B show transmission data 900 for the second page of the WWW home page generated from the HTML document 501.
Figure 9B:
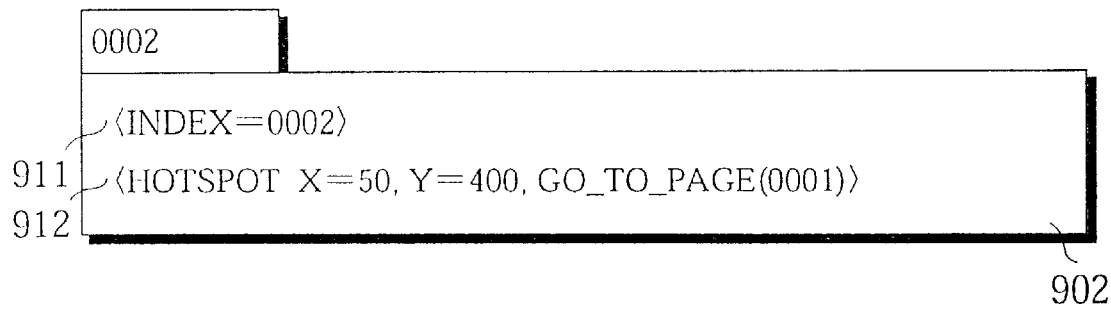
Figure 10A:
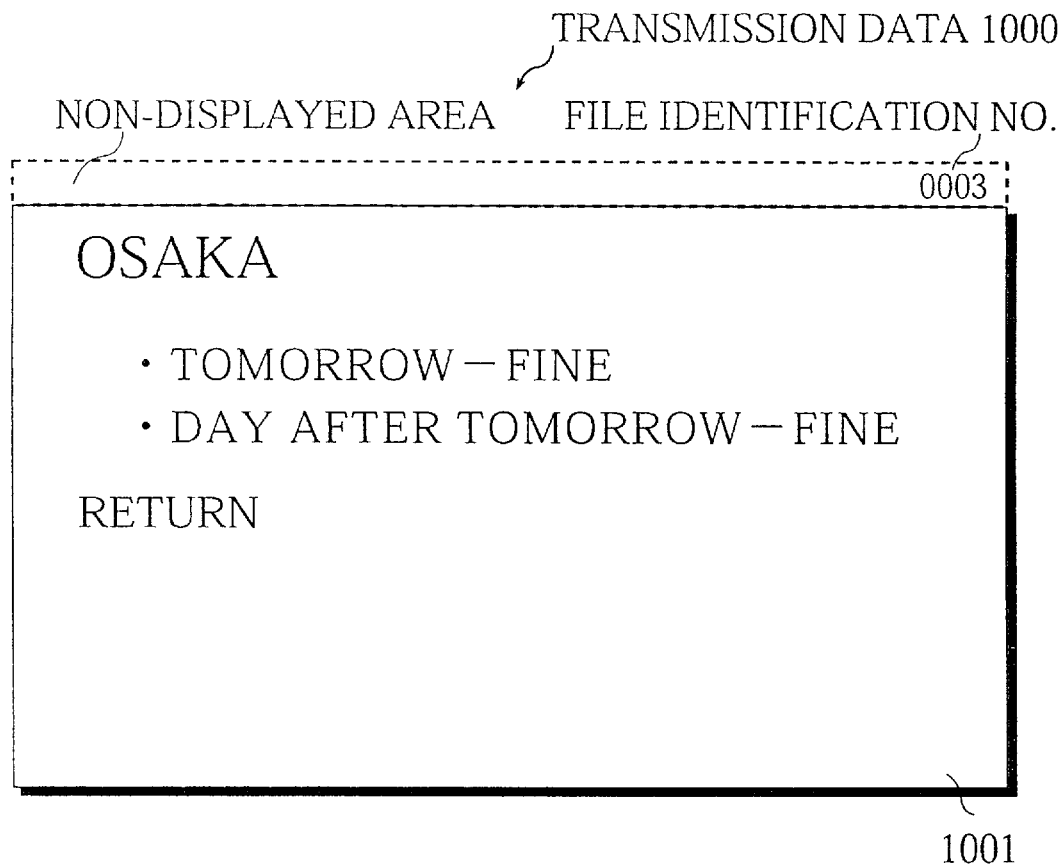
FIGS. 10A and 10B show transmission data 1000 for the third page of the WWW document generated from the HTML document 601.
Figure 10B:
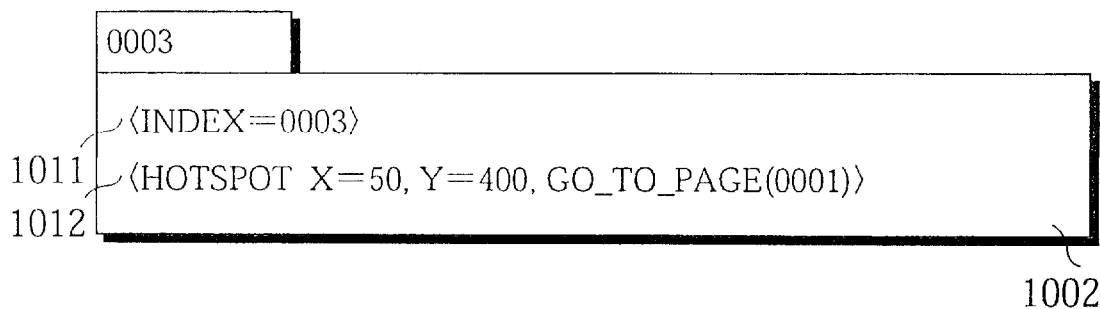

FIGS. 8A to 8C show the transmission data 800 that is the first page of the home page provided by the WWW server. This first page of transmission data 800 has been generated from the HTML, document 301, the audio information "Weather.au," and the image information 401. FIGS. 9A and 9B show the transmission data 900 that is the second page of the home page provided by the wow server which has been generated from the HTML document 501. FIGS. 10A and 10B show the third page of transmission data 1000 that is the third page of the home page which has been generated from the HTML document 601. A shown in FIGS. 8A to 8C, the transmission data 800 includes the display image information 801, the audio information 802, and the link information 803 which is related to display image information 801. Here, FIG. 8A shows the display image which is the content of the display image information 801, FIG. 8B shows a representation of the content of the audio information 802, and FIG. 8C shows the content of the link information 803.

In FIG. 8A, the area surrounded by the dotted line above the display image information 801 is a non-displayed area which is provided in each set of display image information, As its name suggests, this non-displayed area is not displayed on the screen of the display unit 154. An image of an identification number, such as "0001" shown in the drawing, is written into the top-right corner or the non-displayed area by the transmission data generating unit 112. The displayed area of display image information 801 is one display image which is composed of an image which was originally expressed as image information and character strings which have been converted from the original character code files into images.

The audio information 802 is linked to the character string "AUDIO INFORMATION" which is a hot spot in the HTML document 301 Here, the file which includes the audio information 802 is also given the identification number "0001", as shown in FIG. 8B.

The file storing the link information 803 is also given the identification number "0001", as shown in FIG. 8C. This link information 803 is used for control purposes, and is not displayed. "<INDEX=0001>" on line 811 of the link information 803 is the index information which indicates that the file identification number of the transmission data 800 is "000".

The character string on line 812 indicates that instruction "GO_TO_PAGE(0002)" is related to a position in display image information 801 which is specified by the coordinates (100,600) and that a cursor image held by the data receiving apparatus 150 should be displayed at this position. Instruction "GO_TO_PAGE(0002)" indicates that a page having identification number "0002", which in this case corresponds to the transmission data 900, should be displayed.

The character string on line 813 indicates that the instruction "GO_TO_PAGE(0003)" is related to a position in the display image information 801 specified by the coordinates (100,700) and that a cursor image held by the data receiving apparatus 150 should be displayed at this position. This instruction "GO_TO_PAGE(0003)" indicates that a page having identification number "0003", which in this case corresponds to the transmission data 1000, should be displayed.

FIGS. 9A and 9B show the transmission data 900 which is the second page of the home page provided by the WWW server. This transmission data 900 includes the display image information 901 and the link information 902, which is related to the display image information 901. Here, FIG. 9A shows the display image which is the content of the display image information 901 and FIG. 9B shows the content of the link information 902.

As shown in FIG. 9A, an image of the identification number "0002" is written in the top-right corner of the non-displayed area of the display image information 901 which is shown by the dotted line, in the same way as with the display image information 801.

As shown in FIG. 9B, the file storing link information 902 is given the Identification number "0002".

In FIG. 9B, <INDEX=0002>on line 911 is the index information, indicating that the file identification number for transmission data 900 is "0002".

The character string on line 912 indicates that the instruction "GO_TO_PAGE(0001)" is related to a position in the display image information 901 specified by coordinates (050,400) and that a cursor image held by the data receiving apparatus 150 should be displayed at this position. This instruction "GO_TO_PAGE(0001)" indicates that a page having identification number "0001," which in this case corresponds to the transmission data 800, should be displayed.

FIG. 10A and 10B show the transmission data 1000 which is the third page of the home page provided by the WWW server. Transmission data 1000 includes display image information 1001 and link information 1002, which is related to display image information 1001. Here, FIG. 10A shows the display image which is the content of the display image information 1001 and FIG. 10B shows the content of the link information 1002.

As before, an image of the identification number "0003" is written into the top-right corner of the non-displayed area of display image information 1001.

As shown in FIG. 10B, the file storing link information 1002 is given the identification number "0003".

"<INDEX=0003>" on line 1011 of the link information 1002 is the index information, indicating that the identification number of the files of the transmission data 1000 is "0003".

The character string on line 1012 indicates that the instruction "GO_TO_PAGE(0001)" is related to a position in the display image information 901 specified by the coordinates (050,400) and that a cursor image should be displayed at this position. This instruction "GO_TO PAGE (0001)" indicates that a page having identification number "0001", which in this case corresponds to transmission data 800, should be displayed.

Illustrative Example of the Processing by Information Obtaining Unit 111 and the Transmission Data Generating Unit 112

The following is a specific example of the processing performed by the information obtaining unit 111 and the transmission data generating unit 112 in which the files shown in FIGS. 3, 4, 5, and 6 are obtained and are used to generate the transmission data shown in FIGS. 8, 9, and 10.

Processing by the Information Obtaining Unit 111

The information obtaining unit 111 first refers to the file list storing unit 121 and issues a connection request to the indicated WWW server on the Internet. The information obtaining unit 111 then obtains the HTML document 301 "Report.html" from this WWW server, assigns it the file name "Report.html", and stores the file in the buffer. The information obtaining unit 111 also obtains the compressed image information 401, the HTML document 501, and the HTML document 601 in the same way from the WWW server.

Processing by the Transmission Data Generating Unit 112

The transmission data generating unit 112 allocates storage areas in the transmission data holding unit 113 for respectively storing the display image information 801, the audio information 802, and the link information 803 which compose the transmission data 800. In doing so, the transmission data generating unit 112 assigns the identification number "0001" for retrieving transmission data 800 to these storage areas. The transmission data generating unit 112 then fetches the (yet-unprocessed) HTML document 301 from the buffer of the information obtaining unit 111 and writes this document into the file storage area in the work area.

The transmission data generating unit 112 then generates the index information "<INDEX=0001>" shown in line 811 of the transmission data 800 for the first page of the WWW home page from the file name "Report.html" of HTML document 301, before storing the generated index information at the start of the link information storage area for link information 803 which is provided in the transmission data holding unit 113.

The transmission data generating unit 112 then reads the tag "<HTML>" from line 311 in the HTML document 301 and stores the character string "HTML" in the "<HTML>" tag in the tag storage area of the work area. It then refers to the tag table stored in the data conversion table storing unit 122 to interpret the tag, and by doing so recognizes that line 311 is the first line of the HTML document 301. After doing so, it deletes the character string "HTML" from the tag storage area.

Next, the transmission data generating unit 112 reads the tag "<H1>" on line 312 and refers to the tag table to interpret its content. On doing so, it sets the headline flag in the flag storage area in the work area. Here, the headline flag shows that the character string following the "<H1>" tag is a headline and so should be displayed using a headline font. The characters in the character string after the "<H1>" tag are then written one character at a time into the character string storage area until the "</H1>" tag appears, which in the present case results in the character string "WEATHER REPORT" being written into the character string storage area and being converted into display image information using the headline font. This generated display image information is then added to the display image information storage area set in the transmission data holding unit 113. After this, the headline flag in the work area is reset, the character string "WEATHER REPORT" is deleted from the character string storage area, and the character string "H1" is deleted from the tag storage area.

Next, the transmission data generating unit 112 reads the tag "<CENTER>" on line 313 and sets the centering flag in the work area. The centering flag shows that the character string which follows the corresponding tag is to be centered on the display. Here, there is no character string following the "<CENTER>" tag which can be centered, so that the transmission data generating unit 112 continues by reading line 314.

The transmission data generating unit 112 reads the tag '<IMG SRC="Weather.gif">' on line 314 and refers to the tag table to interpret the content of the tag The transmission data generating unit 112 then investigates whether the file for the image information 401, which is expressed by the file name "Weather.gif", is present in the buffer of the information obtaining unit 111, and, since this is the case, reads the file. The transmission data generating unit 112 then converts the image information 401 which is stored and compressed in the read file into a bitmap image or other such format, in accordance with a GIF decompression method, The transmission data generating unit 112 then reads the tag "</CENTER>" on line 315 and arranges the bitmap image converted from image information 401 in accordance with the centering flag set in the work area. The display image information thus generated is then added to the display image information storage area in the transmission data holding unit 113, before the centering flag in the work area is reset.

The transmission data generating unit 112 then reads the "<P>" tag on line 316 and sets the paragraph flag. The paragraph flag shows that the character strings displayed between this start tag and the "</P>" end tag should be displayed as a single paragraph which is to be inserted into the following blank line. As with "WEATHER REPORT" on line 312, the character string "TOMORROW, THE WHOLE OF JAPAN WILL ENJOY SPRINGLIKE WEATHER" between these tags is read and is stored in the character string storage area in the work area. Next, after reading the "</P>" tag, the transmission data generating unit 112 converts the character string "TOMORROW, THE WHOLE OF JAPAN WILL ENJOY SPRINGLIKE WEATHER" into an image using the font for paragraph display which is stored as one of the font files and adds the generated display image information to the storage area in the transmission data holding unit 113 for display image information storage area 801. After this, the content of the work area is cleared as before.

The transmission data generating unit 112 next reads the tag "<UL>" on line 318, interprets it, and sets the itemized list flag in the work area. The itemized list flag shows that each character string which follows the tag and is interpreted as one item should be displayed as a non-numbered item in a list.

The transmission data generating unit 112 next reads the tag "<L1>" on line 319, refers to the tag table, interprets the tag as indicating the start of one item in a list, and sets the item flag in the flag storage area. The item flag shows that the display position on the display screen should be shifted to the next line every time an "<L1>" or "</L1>" tag is read.

The transmission data generating unit 112 reads the tag "<A HREF="Tokyo.html>" following the tag "<L1>" and writes it into the tag storage area. The transmission data generating unit 112 then interprets this tag "<A UREF="Tokyo.html>" and sets the link flag in the flag storage area.

When the extension of the file name given as the attribute of the "<A>" tag indicates audio information, the link flag shows that processing for the audio information is to be performed so that the audio information is converted into a predetermined format and stored in the audio information storage area. When the extension of the file name given as the attribute of the "<A>" tag does not indicate audio information, the link flag shows that the character string between the "<A>" and "</A>" tags which is appended with the link by the "<A>" tags is to be converted into an image with a two-character space provided before it as a cursor display area. The link flag also shows that display image information is to be generated for this character string in addition to hot spot information which is generated in accordance with the format of the hot spot information 702.

The transmission data generating unit 112 reads the character string "TOKYO" between the "<A HREF="Tokyo.html>" and "</A>" tags and writes it into the character string storage area. After reading the "</A>" tag, the transmission data generating unit 112 converts the character string "TOKYO" into an image with a two-character space provided before it as a cursor display area and arranges the character string in accordance with the itemized list flag to generate display image information which it adds to the display image information storage area provided in the transmission data holding unit 113. The transmission data generating unit 112 then calculates the coordinates of the cursor display position as (100,600), and uses these coordinates and the attribute "Tokyo.html" stored in the tag storage area of the work area to generate the hot spot information shown on line 812 of FIG. 8. After doing so, the transmission data generating unit 112 adds the generated hot spot information to the link information storage area provided in the transmission data holding unit 113. Having done so, the transmission data generating unit 112 deletes the character string "A HREF="Tokyo.html" in the tag storage area of the work area and the character string "TOKYO" in the character string storage area, in addition to resetting the link flag.

Next, on reading the "<L1>" tag on line 320, the transmission data generating unit 112 shifts the display position for the next display image to the following line in accordance with the item flag, and, in the same way as with line 319, generates display image information for the character string "OSAKA", in addition to generating the hot spot information shown on line 813 of FIG. 8C. The generated display image information is then added to the display image information storage area provided in the transmission data holding unit 113 and the generated hot spot information is added to the link information storage area. After this, the transmission data generating unit 112 deletes the character string "A HREF="Osaka.html" and the character string "OSAKA", and resets the link flag.

Next, on reading the "<L1>" tag on line 321, the transmission data generating unit 112 shifts the display position for the next display image to the following line in accordance with the item flag, and sets the link flag in accordance with the tag "A HREF="Weather.au". On investigating the file name extension of the attribute in accordance with the link flag, the transmission data generating unit 112 finds that the link destination file is audio information in AU format, so that it converts the AU format audio information into audio information of a predetermined format, before storing the converted audio information in the audio information storage area provided in the transmission data holding unit 113.

Next, on reading the "</L1>" tag on line 322, the transmission data generating unit 112 interprets that the itemized list is complete, and reset the itemized list flag and the item flag.

Finally, on reading the "</HTML>" tag on line 323, the transmission data generating unit 112 interprets that the HTML document 301 has ended, and so terminates the generation process for transmission data 800.

Following this, the transmission data generating unit 112 finds that there is an unprocessed HTML document 501 and so sets a display image information storage area for display image information 901 and a link information storage area for link information 902 in the transmission data holding unit 113 for storing the composite parts of the transmission data 900, in doing so giving both storage areas the identification number "0002" for the retrieval of the transmission data 900. It then reads the unprocessed HTML document 501 from the buffer of the information obtaining unit 111 and writes it into the work area.

The transmission data generating unit 112 then generates the index information "<INDEX=0002>" shown in line 911 of the transmission data 900 which displays the second page of the WWW home page from the file name "Tokyo.html" of the HTML document 501, before storing the generated index information at the start of the link information storage area for the link information 902 which is provided in the transmission data holding unit 113. In the same way as with the generation of the transmission data 800 from the HTML document 301 and the image information 401, the transmission data generating unit 112 then generates the transmission data 900 from the HTML document 501 and the transmission data 1000 from the HTML document 601, with no further explanation of this process being given.

Construction of the Transmission Data Holding Unit 113, the Transmission Data Reading Unit 114, the Multiplexing Unit 115, and the Transmitting Unit 116

The transmission data holding unit 113 includes a display image information storing unit 123, an audio information storing unit 124, and a link information storing unit 125, with simultaneous retrieval from these units being possible.

The display image information storing unit 123 can be realized by RAM (Random Access Memory) or a hard disk device, and is provided with a plurality of display image is information storage areas which are set by the transmission data generating unit 112. Each of these display image information storage areas stores one file of display image information which is generated by the transmission data generating unit 112.

The audio information storing unit 124 can also be realized by RAM (Random Access Memory) or a hard disk device, and is provided with a plurality of audio information storage areas which are set by the transmission data generating unit 112. Each of these audio information storage areas stores one file of audio information which is generated by the transmission data generating unit 112.

The link information storing unit 125 can also be realized by RAM (Random Access Memory) or a hard disk device, and is provided with a plurality of link information storage areas which are set by the transmission data generating unit 112. Each of these link information storage areas stores one file of link information which is generated by the transmission data generating unit 112.

The transmission data reading unit 114 simultaneously reads the display image information, the audio information, and the link information in a some transmission data file from the storage areas provided in the transmission data holding unit 113 in the order of the file identification numbers for the transmission data, and outputs the read information to the multiplexing unit 115. After reading the files for the transmission data which has the final identification number, the transmission data reading unit 114 returns to the transmission data with the identification number "0001" and once again reads the transmission data in the order of the identification numbers. This is to say, the transmission data reading unit 114 cyclically reads the transmission data from the transmission data holding unit 113 in order of identification numbers and outputs the transmission data to the multiplexing unit 115. In doing so, there is the following difference in the reading method when audio information is or is not present. When no audio information is present, the transmission data reading unit 114 advance to the reading of a set of transmission data with the next identification number after reading a first set of transmission data once. When audio information is present, the transmission data reading unit 114 reads the audio information and advances to the reading of a set of transmission data with the next identification number only after reading the display image information and the link information a plurality of times for the period which is required by the reproduction of the audio information. As one example, if the audio information has a reproduction period of two seconds, the transmission data reading unit 114 will read the audio information once, and will read the display image information and link information 60 times (30 frames per second * 2 seconds), before advancing to the reading of a set transmission data with the next identification number. In this way, the transmission time for audio information can be maintained.

The multiplexing unit 115 multiplexes the display image information (including the audio information) and the link information read by the transmission data reading unit 114, and outputs multiplexed data to the transmitting unit 116. Here, this multiplexing can be performed using the same method as conventional teletext broadcasting. In such a case, display image information and audio information are multiplexed in the same way as the images and audio included in conventional TV broadcasts, while link information is multiplexed in the same way as the text information multiplexed with teletext broadcasts. This in to say, when no audio information is present, the display image information is transmitted in the image section of one frame of the television image signal, while the link information is transmitted in the retrace section of the same one frame of the television image signal. When audio information is present, the audio information is transmitted as the television audio signal, while the corresponding display image information and link information are transmitted in the image area and retrace area, respectively, of the television image signal for the number of frames required by the reproduction of the audio information;

The transmitting unit 116 successively transmits the transmission data which has been multiplexed by the multiplexing unit 115 on a TV broadcast ground wave.

Transmission Method for the Transmission Data

FIG. 11A gives a graphic representation of the transmission method used by the transmitting unit 116. FIG. 11A shows the case when n pages (n being a positive integer) of transmission data are generated by the transmission data generating unit 112. In FIG. 11A, a pairing of audio information and display image information with a same identification number is expressed as one transmission unit corresponding to a normal TV broadcast, and the link information for the same identification number is expressed as one transmission unit corresponding to the text information which is multiplexed into a standard teletext broadcast.

As shown in FIG. 11A, in addition to being identified by the some identification number, the display image information, audio information, and link information stored in one transmission data file are transmitted at a corresponding time. Also, the transmission data from the first to the $n^{th}$ page in the transmission data holding unit 113 are cyclically transmitted in the order of identification numbers.

It should be noted here that while the transmission data reading unit 114 has been described at reading the display image information, the audio information, and the link information stored in the same transmission data file simultaneously from the display image information storing unit 123, the audio information storing unit 124, and the link information storing unit 125 and as having the read display image information, audio information, and link information transmitted with related identification numbers and transmission timing, the display image information and the link information do not need to be transmitted with a related timing. As one example, the transmission data reading unit 114 may instead be composed of a first reading unit and a second reading unit. Here, the first reading unit is constructed to continuously read pairs of display image information from the display image information storing unit 123 and audio information from the audio information storing unit 124 which it then outputs to the multiplexing unit 115. The second reading unit is constructed to continuously read only the link information from the link information storing unit 125 which it then outputs to the multiplexing unit 115. By doing so, the display image information and link information belonging to a same transmission data file do not need to be transmitted by the transmitting unit 116 at the same time, since the data receiving apparatus 150 can use the identification number commonly given to the display image information and the link information to recombine pairs of the display image information and the link information.

The multiplexing unit 115 has also been described as multiplexing the display image information (including the audio information) and the link information which are generated by the transmission data generating unit 112, with the transmitting unit 116 transmitting the transmission data which has been multiplexed by the multiplexing unit 115 on a TV broadcast ground wave, although the display image information and link information do not need to be multiplexed together for transmission. As one example, the display image information and the audio information may be transmitted on a TV broadcast ground wave or as a digital satellite broadcast, while the link information may be transmitted using a telephone link and modem, or the like. Transmission here may alternatively be performed using multiple channels.

When digital satellite broadcasting is used as the data transmission method, compression/encryption and multiplexing may be performed according to MPEG2 (Moving Pictures Experts Group) video standard and system standard, so that display image information may be set as I pictures, with the audio a information and link information being set as private information. Here, when it is possible for the display image information, audio information, and link information to be transmitted as digital data, it is no longer necessary to write a graphic representation of the identification number into the non-displayed area of the display image information, so that the identification number can be simply appended to the display image information and audio information, in the same way as with the link information. Incidentally, a detailed description of MPEG2 standard is given in "Saishin MPEG Kyoukasho [Latest MPEG Reader]" published by ASCII Publishing, Inc.

Figure 11B:
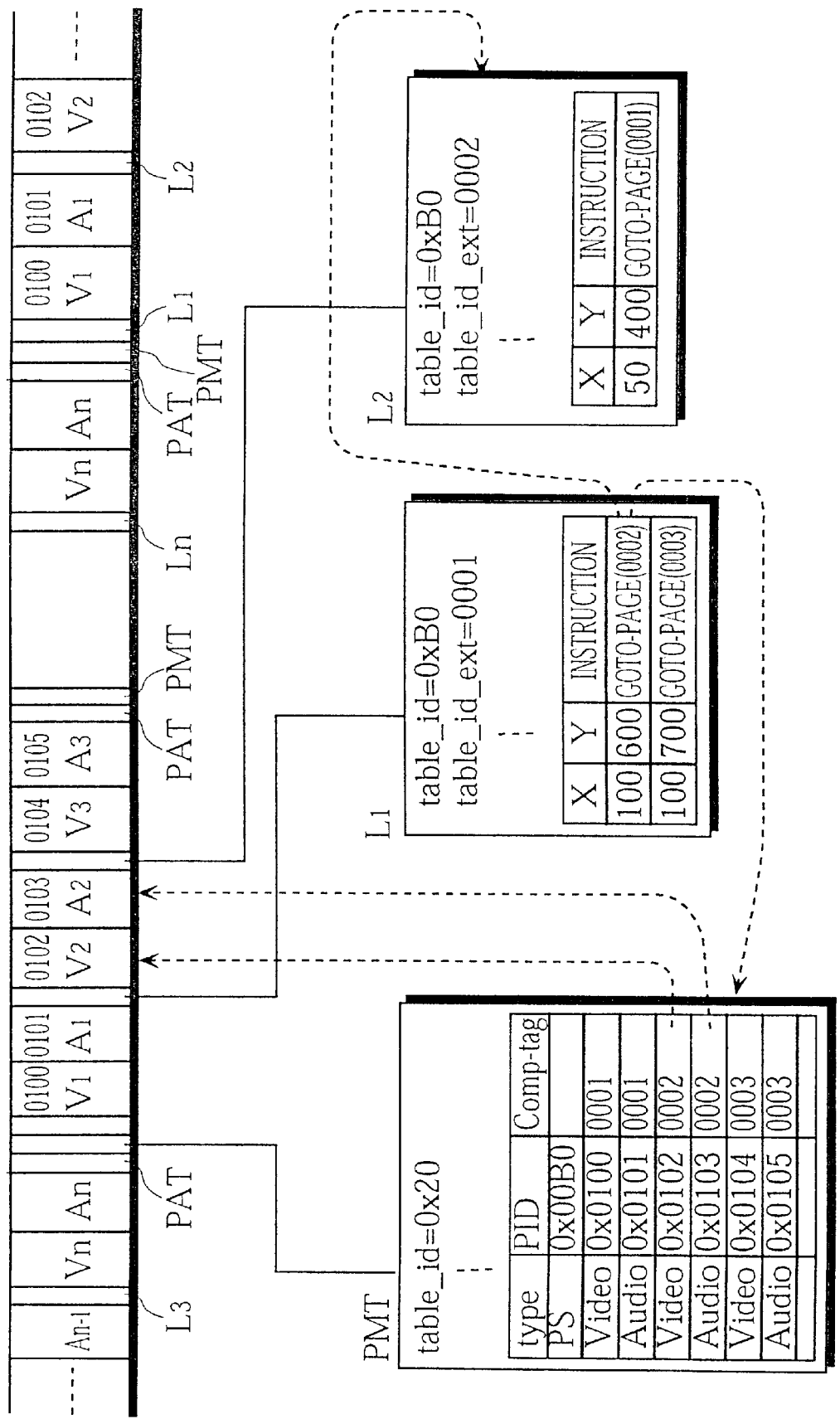
FIG. 11B shows a multiplexed stream transmitted in digital satellite broadcasting.

FIG. 11B shows the multiplexed stream which is transmitted when digital satellite broadcasting is used. The upper part of this drawing snows a transport stream under MPEG2 standard which has been generated by the multiplexing unit 115.

The symbols "V1, A1, L1" in the transport stream represent the display image information, audio information, and link information which have the identification number "0001" and which are read from the transmission data file and multiplexed together. This is also the case for "V2, A2, L2" . . . "Vn, An, Ln". "V1" is a video elementary stream which shows the display image information which has been converted into I (Intra) pictures under MPEG2 standard, with the PID (Packet IDentifier) "0x0100" having been attached to identify the stream. This is also the case for "V2" . . . "Vn".

"A1" is an audio elementary stream which shows the audio information which has been converted under MPEG2 standard, with the PID "0x0101" having been attached to identify the stream. This is also the case for "A2" . . . "An".

"L1–Ln" are private sections according to MPEG2 standard for attaching each set of link information, with the PID "0xB0" having been attached to identify these as private sections. Here, identification numbers are also set in the table ID extensions to identify separate sets of link information. Each of these sets of link information is set at least one pairing of one part of the image area of the corresponding display image and information showing a link to another display image. An one example, in "L1", the display area centered on the coordinates (X,Y)=(100,600) is set the link "GOTO_PAGE:(0002)" representing a link to the display image with the identification number "0002", while the display area centered on the coordinates (X,Y)=(10, 700) is set the link "GOTO_PAGE(0003)" representing a link to the display image with the identification number "0003".

The correspondence between the PIDs described above and the identification numbers is set according to the PMT (Program Map Table) under MPEG2 standard. Here, the correspondence between the PIDs and the identification numbers can be written in the descriptors of the private sections, such as by setting the identification numbers as the component tags in the PMT, as shown in FIG. 11B.

In the above case, the video elementary stream, audio elementary stream, and private sections are generated by the transmission data generating unit 112 and are stored in the transmission data holding unit 113. Here, a set of one video elementary stream, one audio elementary stream, and one private section stored in the transmission data holding unit 113 corresponds to one transmission data file. Here, the video elementary stream, audio elementary stream, and private section stored as one set in the transmission data holding unit 113 are each read once, with the transmission data reading unit 114 cyclically reading all of the transmission data files. Using this data, transport streams are generated by the multiplexing unit 115.

As described above, by multiplexing n sets of display image information, audio information, and link information with a PMT in the transport stream, transmission data can be easily transmitted using digital satellite broadcasting.

Overview of the Procedure of the Data Transmitting Apparatus 110

Figure 12:
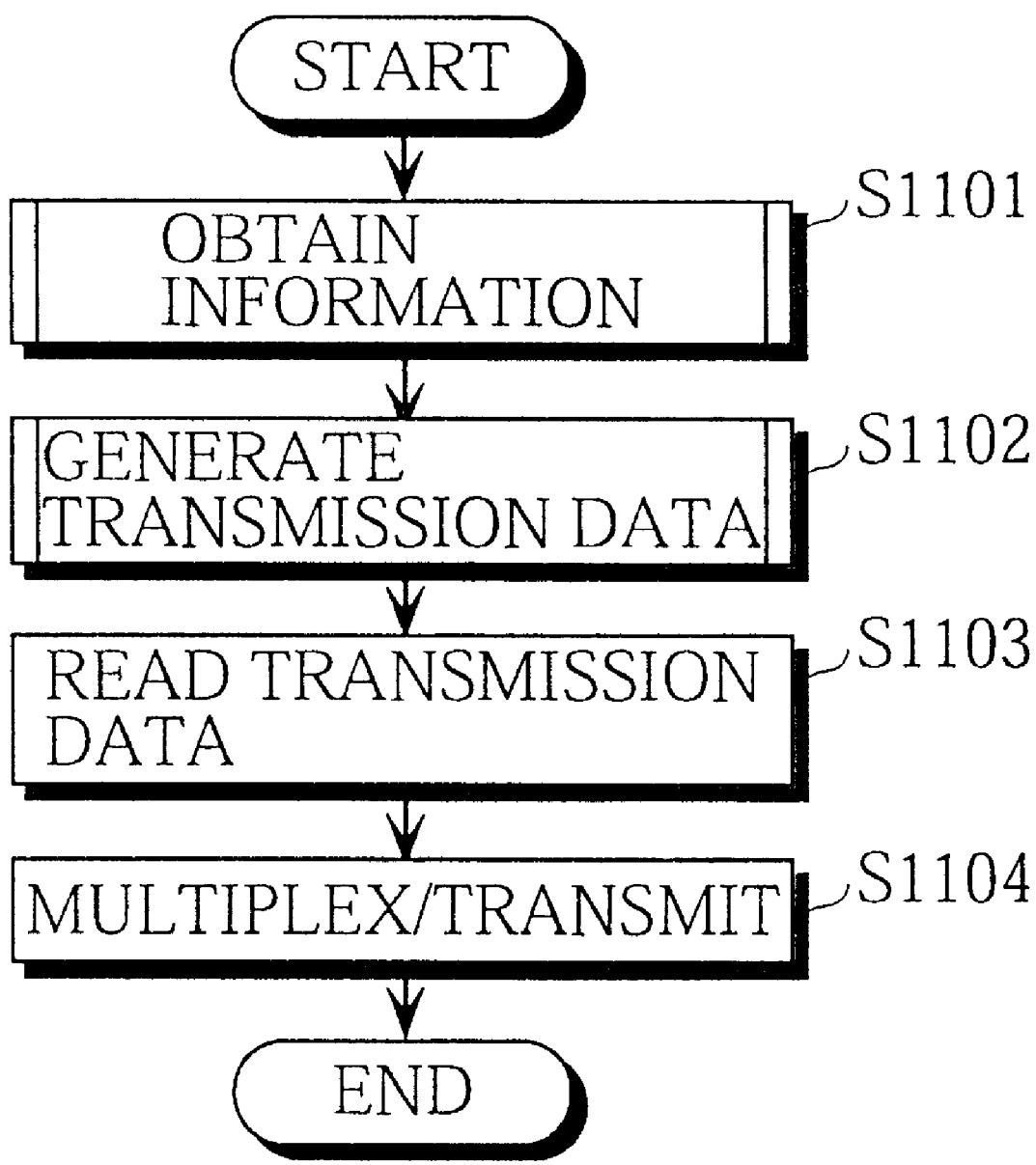
FIG. 12 is a flowchart showing an overview of the procedure of the data transmitting apparatus 110.
Figure 13:
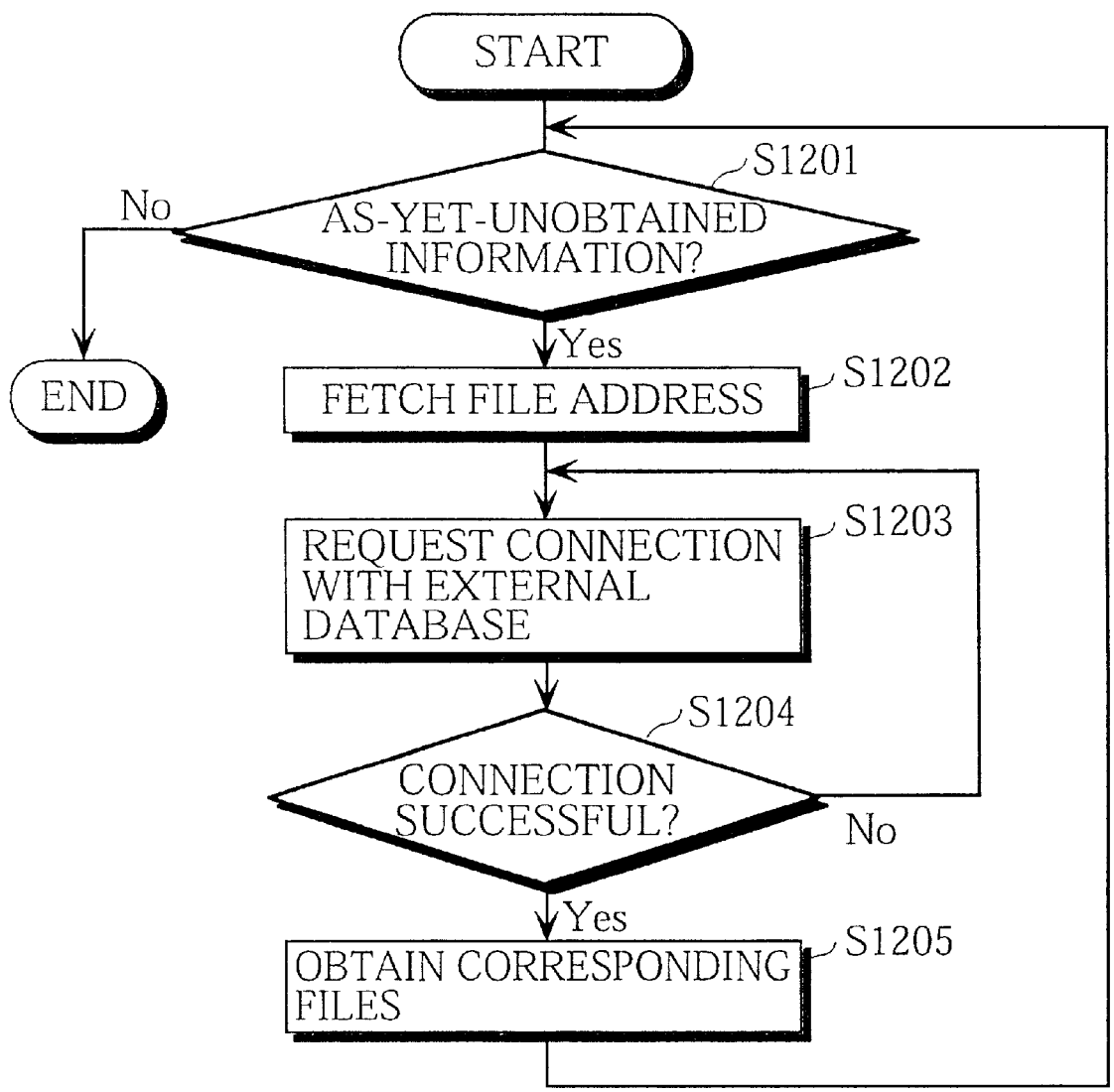
FIG. 13 is a flowchart showing an example information obtaining procedure of the information obtaining unit 111.
Figure 14:
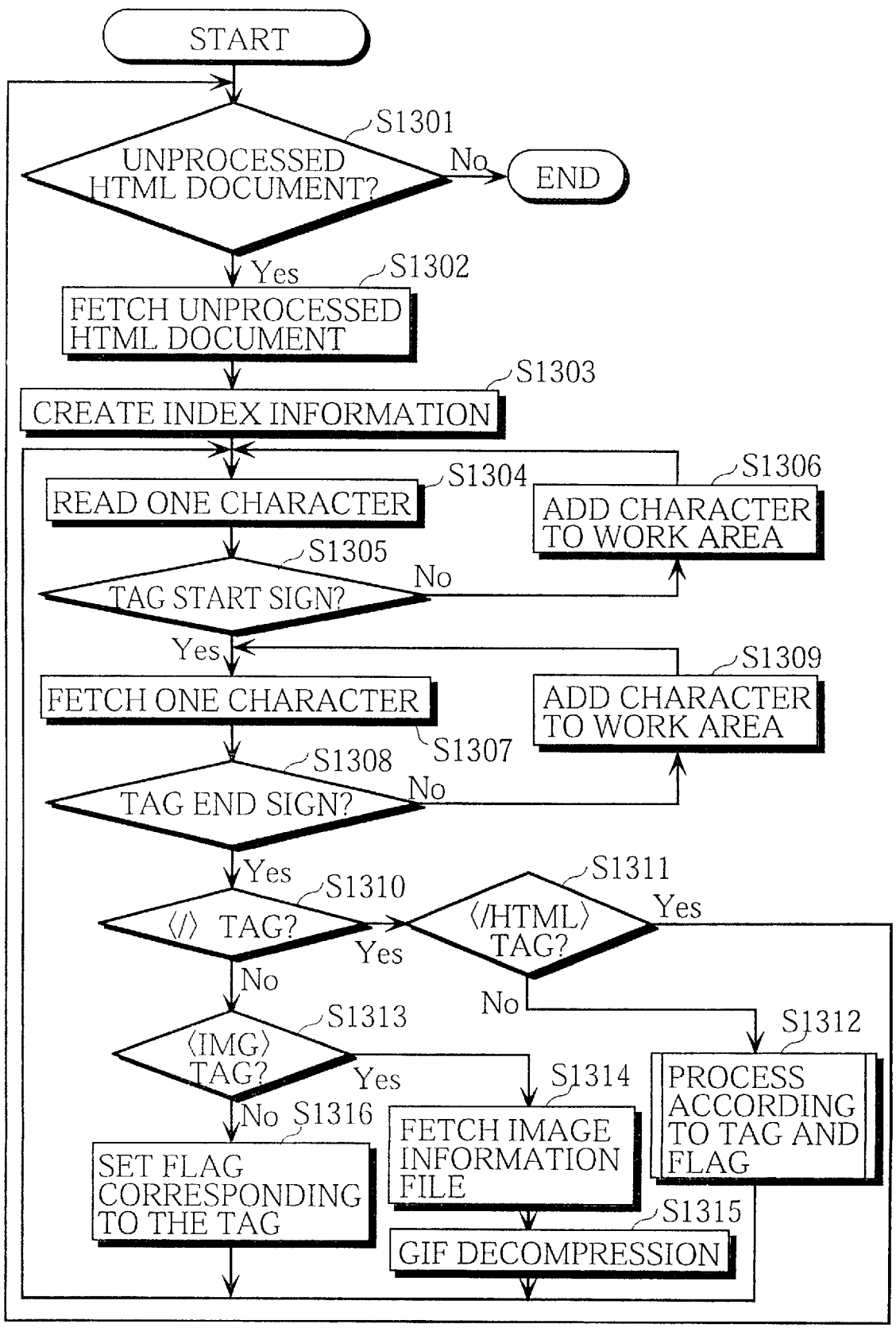
FIG. 14 is a flowchart showing an example procedure for generating transmission data by the transmission data generating unit 112.

The following is a detailed explanation of the procedure of the data transmitting apparatus 110, with reference to FIGS. 12 to 14.

FIG. 12 is a flowchart showing an overview of the procedure of the data transmitting apparatus 110.

The information obtaining unit 111 obtains a desired set of information from an external database and stores it in its internal buffer (step S1101).

The transmission data generating unit 112 interprets the information obtained by the information obtaining unit 111 and generates display image information, audio information, and link information, which it stores in the transmission data holding unit 113 (step S1102).

The transmission data reading unit 114 successively reads the transmission data from the transmission data holding unit 113 in order of identification numbers (step S1103).

The multiplexing unit 115 multiplexes the display image information (including the audio information) with the link information, and the transmitting unit 116 transmits the multiplexed transmission data using a television broadcast ground wave.

Procedure of the Information obtaining Unit 111

FIG. 13 is a flowchart showing an example information obtaining procedure of the information obtaining unit 111.

The information obtaining unit 111 first refers to the file list in the file list storing unit 121 and checks whether there is any as-yet-unobtained information (step S1201). If there is not, the information obtaining procedure is terminated. If there is, the file addresses (or URLS) or the as-yet-unobtained sets of information are fetched one at a time (step S1202).

The information obtaining unit 111 then requests a connection with an external database, based on the fetched address (step S1203), and checks whether the connection has been successively established (step S1204). If the connection is unsuccessful, the processing returns to step S1203 (step 81204).

If the connection has been successful, the information obtaining unit 111 reads the file names of the as-yet-unobtained information from the file list, obtains the corresponding files from the external database, and stores is them in the internal buffer (step S1205). The processing then returns to step S1201.

Procedure of the Transmission Data Generating Unit 112

FIG. 14 is a flowchart showing an example procedure for generating transmission data by the transmission data generating unit 112.

The transmission data generating unit 112 first refers to the buffer in the information obtaining unit 111 and checks whether any unprocessed HTML documents exist (step S1301). If no such documents exist, the display image generating procedure is terminated. If there is such a document, the transmission data generating unit 112 establishes the transmission data storage areas in the transmission data holding unit 113, assigns an identification number to each transmission data storage area, and then fetches an unprocessed HTML document from the buffer (step S1302).

The transmission data generating unit 112 creates index information indicative of the file name of the transmission data from the file name of the fetched HTML document, and adds the index information to the link information storage area established in the transmission data holding unit 113 (step 81303).

One character is read from the fetched HTML document and is written into the character string storage area (step S1304).

The transmission data generating unit 112 then checks whether the read character is a tag start sign "<" (step S1305). If so, the processing advances to step S1307, or if not, the character is added to the character string storage area in the work area, and the processing returns to step S1304 (step S1306).

The next character is read (step S1307), and the transmission data generating unit 112 judges whether the read character is a tag end sign ">" (step S1308). If so, the processing advances to step S1310, or if not, the read character is added to the tag storage area in the working area, before the processing returns to step S1307 (step S1309).

The character string in the tag storage area is compared with the tag table, and a check is performed to see whether it starts with a "/" sign (step S1310). If it does, the transmission data generating unit 112 judges whether the read tag is a "</HTML>" tag (step S1311). If 8o, the transmission data generating unit 112 resets the work area, and the processing returns to step S1310. If the read tag in not "</HTML>", the transmission data generating unit 112 operates in accordance with the least significant of the flags set in the flag storage area corresponding to this read tag, and resets the corresponding storage area in the work area (step S1312), before the processing returns to step S1304.

In step S1310, when the character string does not start is with "/", a check is performed to see whether the read tag is "<ING>" (step S1313). If so, the transmission data generating unit 112 fetches the image information file specified by the attribute of the "<IMG>" tag from the buffer in the information obtaining unit 111 (step S1314). The fetched image information is converted in accordance with a GIF decompression method into image information expressed as bitmap data (step S1315), and the processing returns to step S1304.

If the read tag is not "IMG>", the character string in the tag storage area is compared with the content of the tag table and a flag corresponding to the tag is set in the flag storage area. The transmission data generating unit 112 then operates in accordance with this tag (step S1316), before the processing returns to step S1304.

A variety of tags can be employed in the HTML documents, and the processes represented by these tags can be performed in the same way as a conventional browser. Accordingly, the following explanation focuses on an example of the processing in step S1312 for the tag "</A>" which relates to the link information which generated in a special format for this data communication system 100.

Figure 15:
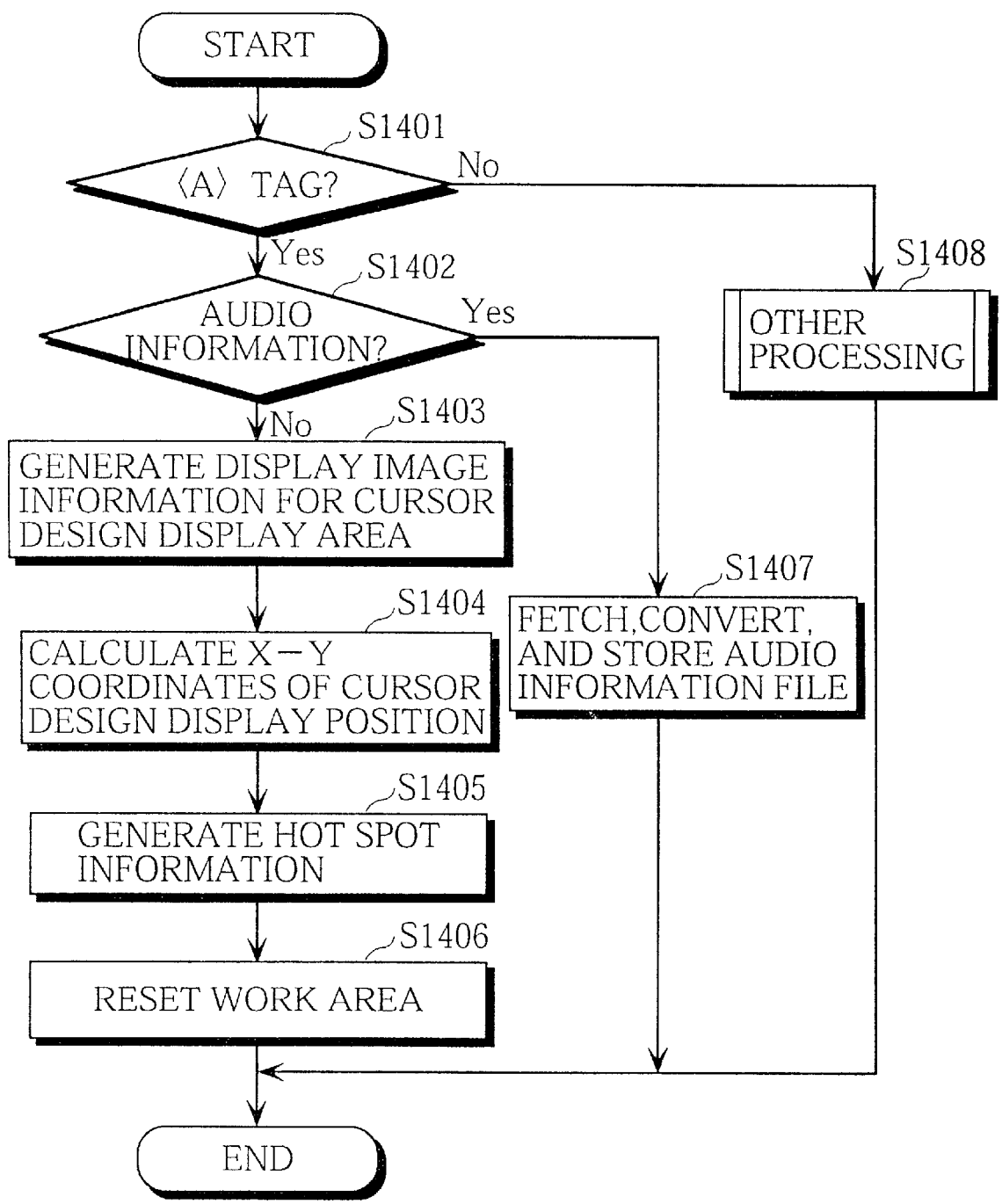
FIG.15 is a flowchart showing a detailed example of the processing in step S1312 of FIG. 14.

FIG. 15 is a flowchart showing a detailed example of the processing in step S1312 of FIG. 14.

The transmission data generating unit 112 first checks whether the read tag is "<A>" (step S1401), and if not, the processing advances to step S1408.

If the read tag is "<A>", the transmission data generating unit 112 judges whether the link destination file specified by the attribute is an audio information file (step S1402). If it is, the processing advances to step S1407, or if not, the transmission data generating unit 112 generates display image information for the character string established in the character string storage area, in doing so leaving a display area for displaying a cursor design, before adding the generated display image information to the display image information storage area provided in the transmission data holding unit 113 (step S1403).

The transmission data generating unit 112 then calculates the X-Y coordinates which express the display position of the cursor design (step S1404).

The transmission data generating unit 112 then generates hot spot information based on the calculated X-Y coordinates and the attribute established in the tag storage area, and adds it to the link information storage area provided in the transmission data holding unit 113 (step S1405).

The transmission data generating unit 112 then resets the link flag in the work area, and deletes the character string in the tag storage area and the character-sequence storage area (step S1406).

The transmission data generating unit 112 fetches an audio information file and converts the audio information contained in the file into information of a predetermined format which it stores in the audio information storage area (step S1407).

The transmission data generating unit 112 operates in accordance with the read tag (step S1408).

Structure of the Data Receiving Apparatus 150

The following is an explanation of the components of the data receiving apparatus 150, with reference to FIGS. 16 to 20.

Structure of the Separating Unit 151

The separating unit 151 includes a read buffer 161 for reading the identification number allotted to transmission data. The read buffer 161 has storage areas for temporarily holding the display image information (including audio information) included in one transmission file and the link information included in one transmission file.

The separating unit 151 separates display image information (including audio information) and link information from the received transmission data, and stores the separated display image information and link information in the corresponding storage areas of the read buffer 161. The identification number assigned to the display image information stored in the storage area is read by recognizing the image written in the predetermined part of the non-displayed area of the display image information. The identification number assigned to the link information is read in the same manner as when reading an identification number assigned to a conventional digital data file. If the read identification number is the identification number designated by the control unit 155, the display image information (Including audio Information) or the link information held by the read buffer 161 is stored in the corresponding storage area in the received data holding unit 152. At this point, any audio information which is present is stored by the separating unit 151 in a corresponding storage area provided in the received data holding unit 152 at the same time as the display image information is stored, so that the audio information is gradually accumulated while the display image information with the identification number designated by the control unit 155 is repetitively transmitted. By doing so, audio information which is transmitted across a plurality of frames can be separated from the transmission data.

If the read identification number is not the identification number designated by the control unit 155, the display image information (including audio information) or its link information held by the read buffer 161 is discarded. The reading of new display image information (including audio information) and link information is continued, and the above procedure is repeated until the identification number designated by the control unit 155 is detected.

Structures of the Received Data Holding Unit 152, the Reproducing Unit 153, and the Display Unit 154

The received data holding unit 152 stores display image information (including audio information) and link information separated by the separating unit 151 linked with their assigned identification number. The storage area for storing the display image information can be achieved by RAM or a hard disk device capable or storing one static image which is the size of the display screen.

The reproducing unit 153 reproduces the display image information stored in the received image holding unit 152 along with the graphics information (described later) inputted from the control unit 155, in accordance with an indication which it receives from the control unit 155. The reproducing unit 153 outputs the reproduced image to the display unit 154. The reproducing unit 153 also reproduces the stored audio information in synchronization with the reproduction display image information and outputs the reproduced audio to the audio output unit 157.

The display unit 154 can be realized by a television monitor which display image according to NTSC (National Television System Committee) standard, and is used to display the display image and cursor design on its screen, in accordance with the input from the reproducing unit 153.

Structure of the Control Unit 155

The control unit 155 sets an initial value in the register storing a variable (described later), and instructs the separating unit 151 to fetch the display image information (including audio information) and link information of a page specified by this initial value, which as one example can be the identification number "0001".

The control unit 155 instructs the reproducing unit 153 to reproduce the display image information (including audio information), every time new display image information (including audio information) is stored in the received data holding unit 152. Every time new link information is stored in the received data holding unit 152, the control unit 155 interprets the link information and generates a cursor design correspondence table in which cursor designs (described later) are generated for each cursor display position. These cursor designs are expressed by cursor information which is held inside the control unit 155. The control unit 155 outputs design information expressing a cursor design together with the cursor position to the reproducing unit 153, as well as indicating the reproduction of the cursor design.

FIG. 16 shows an example of the cursor design correspondence table which the control unit 155 generates to control the display position of the cursor design.

The cursor design correspondence table shows the correspondence between each cursor display position which is expressed in the hot spot information in the link information stored in the received data holding unit 152 and the cursor number for the cursor design to be displayed at each cursor display position. The control unit 155 assigns cursor numbers to each cursor display position in the link information in order of lowest Y coordinate and then lowest X coordinate, as one example, and writes each display position into the item with corresponding cursor number in the cursor design correspondence table.

FIG. 17 shows an example of the design information stored by the control unit 155. As shown in FIG. 17, the control unit 155 stores cursor information which expresses a cursor design for each cursor number when the number is selected (referred to as the "selection state") and a cursor design for each number when the number is not selected (referred to as the "non-selection state").

On receiving an interrupt from the signal receiving unit 156, the control unit, 155 interprets the type of input signal stored in the signal receiving unit 156, selects the design information of the corresponding cursor design, and outputs the cursor information to the reproducing unit 153. Following this, the control unit 155 controls the handling of the received data by the separating unit 151, in accordance with the cursor whose selection has been confirmed.

Display Control Procedure for the Received Data

The following is a detailed explanation of the display control procedure by the control unit 155 for a set of received data, a set of received data referring to display image information (including audio information) and link information which have been stored in corresponding storage areas in the received data holding unit 152 by the separating unit 151 and which have the same identification number.

The control unit 155 sets a predetermined value, such as "1", into the variable "P-Index" which expresses the identification number of the received data to be displayed. The control unit 155 then sets a predetermined value, such as "1", into the variable "Cur-Pos" showing the cursor number which is in the selection state. Following this, the control unit 155 instructs the separating unit 151 to obtain the transmission data indicated by the variable "P-Index". The control unit 155 then interprets the link information in the received data which is received in accordance with this instruction and is stored in the received data holding unit 152, and outputs the cursor information for each cursor, the cursor indicated by the variable Cur-Pos being in the selection state, together with the display position to the reproducing unit 153. Here, when an interrupt from the signal receiving unit 156 occurs, the control unit 155 interprets the control signal stored in the signal receiving unit 156. First, the control unit 155 checks whether the input signal was "Up", in which case the control unit 155 decreases the value of variable Cur-Pos by 1. If not, the control unit 155 checks whether the input signal was "Down", in which case the control unit 155 increases the value of variable Cur-Pos by 1. If not, the control unit 155 checks whether the input signal was "Enter", in which case the control unit 155 finds the coordinates of the display position from the cursor number given by the variable Cur-Pos, and obtains the identification number of the file which is the link destination file written in the hot spot information for these coordinates. The control unit 155 then sets this identification number in the variable P-Index, and instructs the separating unit 151 to obtain the transmission data shown by the variable P-Index.

Structure of the Signal Receiving 156 and the Audio Output Unit 157

On receiving an input signal from a remote controller (not-illustrated) or the like, the signal receiving unit 156 creates an interrupt for the control unit 155 in accordance with the received input signal, as well as holding the received input signal.

The audio output unit 157 can be realized by a speaker or the like, and is used to output the reproduced audio information as audio.

Example of a Display Image

Figure 18:
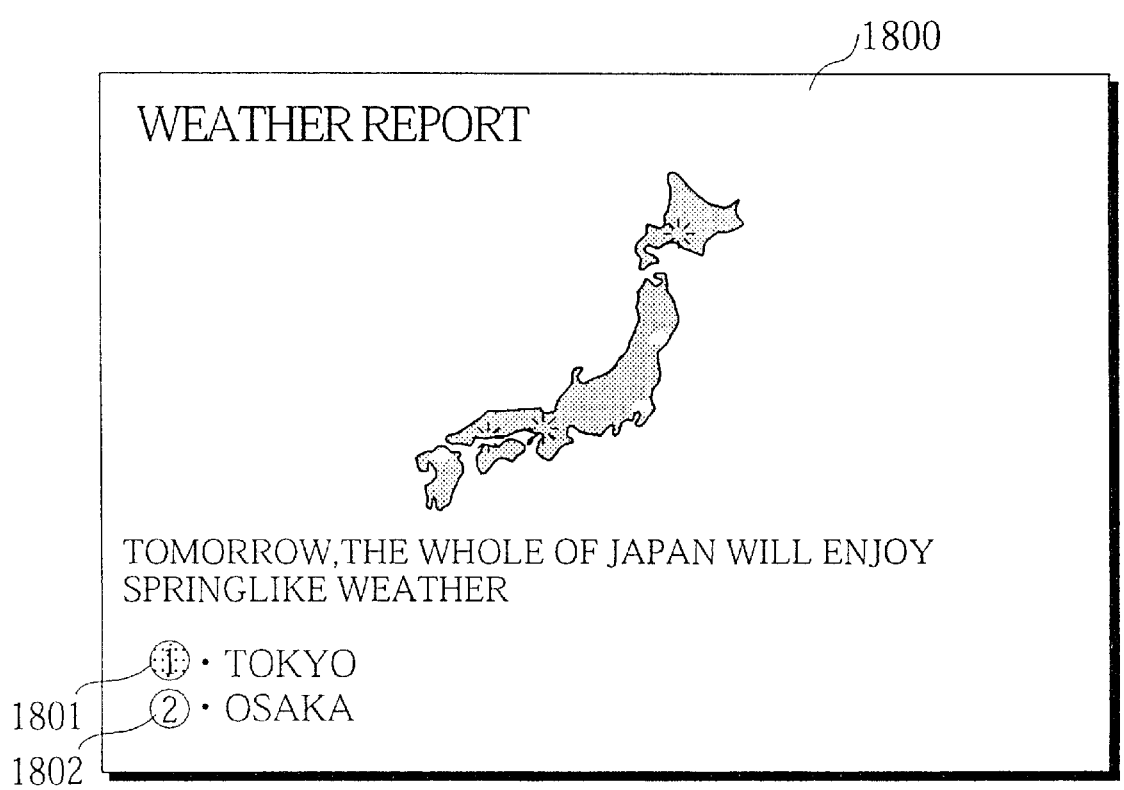
FIG. 18 shows the display image 1800 which is the initial screen displayed by the display unit 154 based on the transmission data 800 shown in FIGS. 8A to 8C.

FIG. 18 shows display image 1800 for the initial screen which is displayed by the display unit 154 based on the transmission data 800 shown in FIGS. 8A to 8C.

As shown in FIG. 18, the display image 1800 has the is cursor design 1801 corresponding to cursor number "1" displayed at a display position (100,600) indicated by the display image information 801, in accordance with the hot spot information given on line 812 of the link information 803. It should be noted here that the cursor information which represents the selection state has been selected for cursor design 1801 in accordance with the initial value of the variable Cur-Pos which is held by the control unit 155.

In the same way, the cursor design 1801 corresponding to cursor number "2" is displayed at a display position (100, 700), in accordance with the hot spot information given on line 813 of the link information 803. It should be noted here that the cursor information which represents the non-selection state has been selected for cursor design 1802 since its cursor number "2" does not coincide with the initial value of the variable Cur-Pos.

Here, since the transmission data 800 includes audio information 802 in addition to the display image information 801, an audio commentary is outputted by the audio output unit 157 when the display image 1800 is displayed on the display unit 154.

Figure 19:
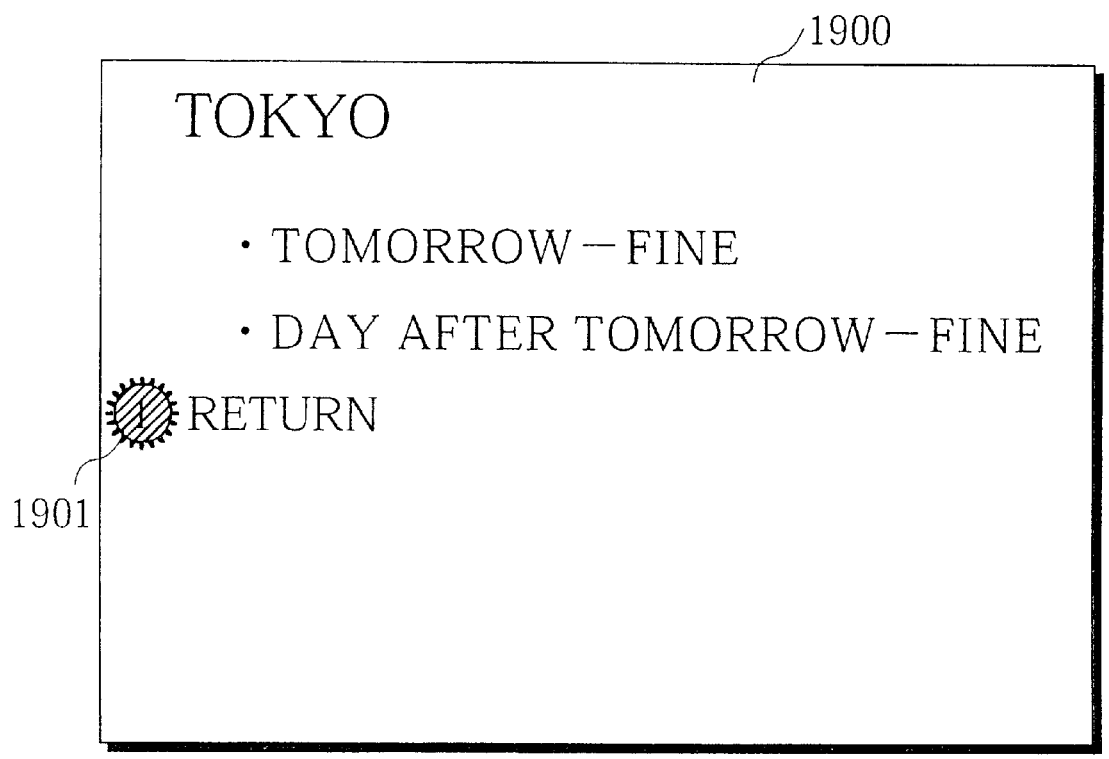
FIG. 19 shows the display image 1900 which is the initial screen displayed by the display unit 155 based on the transmission data 900 shown in FIGS. 9A and 9B.

FIG. 19 shows the display inage 1900 which is the initial screen displayed by the display unit 154 for the transmission data 900 shown in FIGS. 9A and 9B.

As with the display image 1800 in FIG. 18, the display image 1900 has the cursor design 1901 displayed at a display position (050,400) indicated by the display image information 901, in accordance with the hot spot information given on line 912 of the link information 902. Here, the cursor information for the selection state is selected as cursor design 1901.

Figure 20:
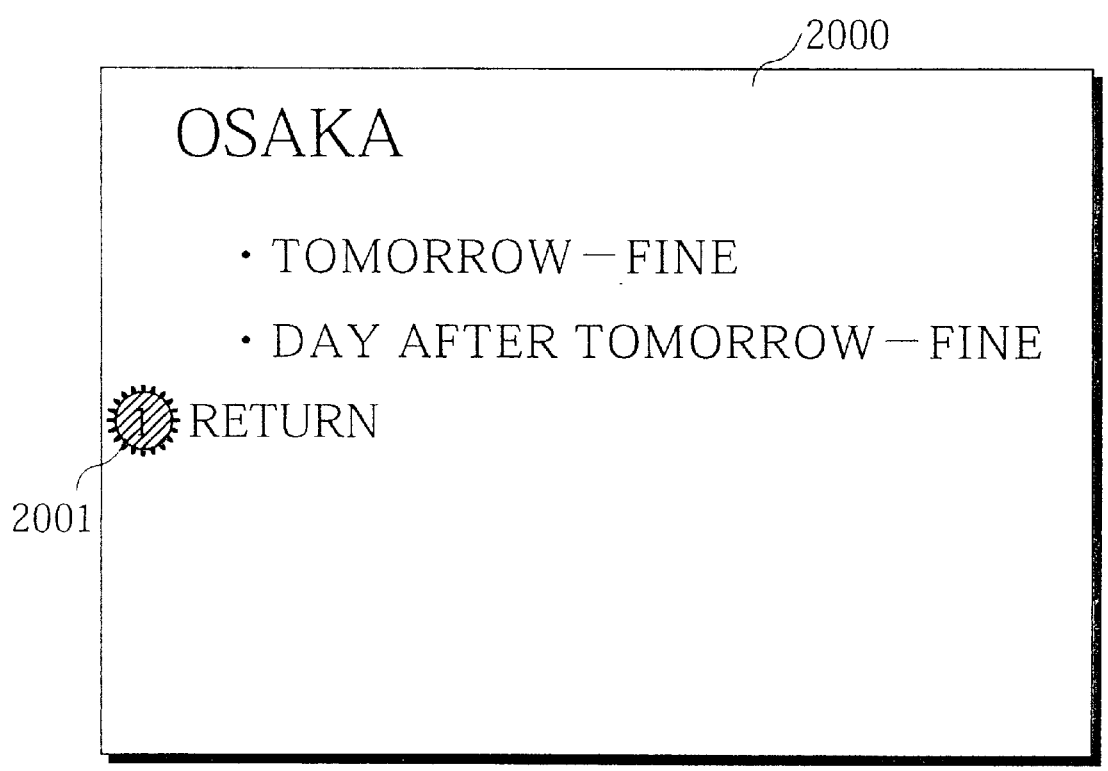
FIG. 20 shows the display image 2000 which is the initial screen displayed on the display unit 154 for the transmission data 1000 shown in FIGS. 10A and 10B.

FIG. 20 shows the display image 2000 which is the initial screen displayed by the display unit 154 for the transmission data 1000 shown in FIGS. 10A and 10B.

As before, the display image 2000 has the cursor design 2001, which corresponds to cursor number "1" and which shows the selection state, displayed at a display position (050,400) indicated by the display image information 1001, in accordance with the hot spot information given on line 1012 of the link information 1002.

Specific Example of the Procedure of the Control Unit 155

The following is an explanation of a specific example of the procedure executed by the control unit 155 when displaying the display image 1800 on the display unit 154 based on the transmission data 800.

The control unit 155 first sets the initial value of the variable P-Index at "0001" and the initial value of the variable Cur-Pos at "1". Next, the control unit 155 instructs the separating unit 151 to obtain the display image information 801 (including the audio information 802) and the link information 803 which have the identification number "0001" Bet in the variable P-Index. The control unit 155 then instructs the reproducing unit 153 to reproduce the display image information 801 (including audio information 802) stored in the received data holding unit 152. The reproducing unit 153 reproduces the display image information 081 and outputs it to the display unit 154 and simultaneously reproduces the audio information 802 which it outputs to the audio output unit 157. The control unit 155 interprets the link information 803 stored in the received data holding unit 152, generates a cursor design correspondence table, and outputs design information for each cursor and their display positions to the reproducing unit 153. At this point, the cursor indicated by the variable Cur-Pos, which is to say the first cursor, is displayed in the selection state The control unit 155 then waits for an input from the signal receiving unit 156. Here, suppose that a "Down" signal is inputted into the signal receiving unit 156 from an external remote controller. When the input signal is "Down", the control unit 155 increases the value of variable Cur-Pos by "1", making it "2". Next, the cursor information for the selection state is selected as the design for cursor number ¢2" which is indicated by this updated variable Cur-Pos, and the cursor information for the non-selection state is selected as the design for cursor number "1" which was formerly indicated by the variable Cur-Pos, with these sets of cursor information being outputted to the reproducing unit 153.

The control unit 155 waits for an interrupt from the signal receiving unit 156, with the following explanation describing the case when the signal receiving unit 156 stores an input signal for a pressing of the "Enter" key after generating the interrupt. If the input signal is "Enter", the control unit 155 reads the X-Y coordinates (100,700) corresponding to cursor number "2" which is indicated by the variable Cur-Pos from the cursor design correspondence table. Next, the control unit 155 reads the identification number of the link destination file of the hot spot information on line 813, based on these X-Y coordinates (100,700), and obtains the identification number "0003". Next, this identification number "0003" is set as the value of the variable P-Index. Following this, the control unit 155 instructs the separating unit 151 to obtain the display image information 1001 and the link information 1002 which have the identification number indicated by this variable P-Index. The control unit 155 then resets the variable Cur-Pos to "1".

By repeating the processing described above, the display image 2000 shown in FIG. 20 can be displayed on the display unit 154. Here, if an interrupt occurs when the value of the variable Cur-Pos is "1", and an input signal for "Enter" is being stored by the signal receiving unit 156 when the control unit 155 refers to the signal receiving unit 156, the control unit 155 will have the display image 1900 shown in FIG. 19 displayed on the display unit 154, as described above.

Procedure for Display Control

Figure 21:
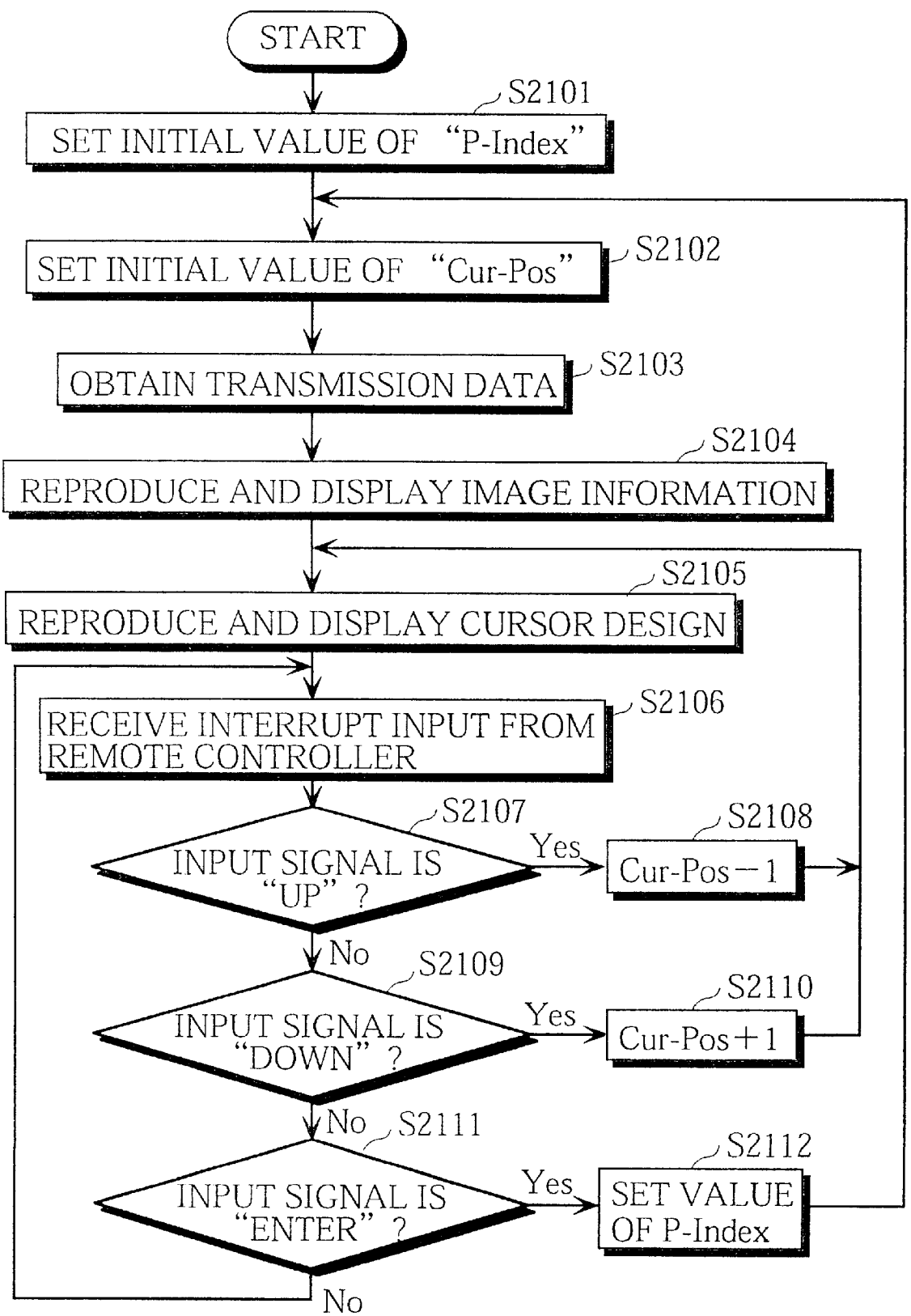
FIG. 21 is a flowchart showing an example procedure for display control which is performed by the control unit 155.

FIG. 21 is a flowchart showing an example procedure for display control which is performed by the control unit 155.

The control unit 155 first sets the initial value of the variable P-Index which indicates the identification number of the transmission data to be obtained (step S2101).

The control unit 155 then sets the initial value of the variable Cur-Pos which indicates the cursor number of the cursor in the selection state for the start of display of each display screen (step S2102).

The control unit 155 then instructs the separating unit 151 to obtain the transmission data which has the identification number indicated by the variable P-Index. The separating unit 151 then separates the display image information and link information in accordance with the indication from the control unit 155, and stores the display image information and lint information with their identification number in the received data holding unit 152 (step S2103).

On being instructed by the control unit 155, the reproducing unit 153 reproduces the display image information in the received data holding unit 152 and outputs it to the display unit 154. When there is audio information which is related to the display image information, the reproducing unit 153 reproduces this audio information and outputs it to the audio output unit 157 (S2104).

The control unit 155 interprets the link information in the received data holding unit 152 and outputs the design information for the cursor designs together with the X-Y coordinates for the display positions of the cursors, as well as an instruction to display the design information to the reproducing unit 153. The reproducing unit 153 reproduces the design information inputted from the control unit 155 and outputs it to the display unit 154 (step S2105). By doing so, one display image is displayed by the display unit 154.

The control unit 155 waits for an interrupt from the signal receiving unit 156 (step S2106), and on receiving an interrupt, checks whether the input signal held by the signal receiving unit 156 is "Up" (step S2107).

If the input signal is "Up", the control unit 155 subtracts "1" from the value of the variable Cur-Pos (step S2108). If not, the control unit 155 checks whether the input signal held by the signal receiving unit 156 is "Down" (step S2109).

If the input signal is "Down", the control unit adds "1" to the value of the variable Cur-Pos (step S2110). If not, the control unit 155 checks whether the input signal held by the signal receiving unit 156 is "Enter" (step S2111).

If the input signal in "Enter", the control unit 155 uses the cursor number shown by the variable Cur-Pos to reference the cursor design correspondence table and so finds the cursor display position (X,Y) which it then uses to find the value of the identification number of the link destination file in the hot spot information. The control unit 155 then sets this identification number as the value of the variable P-Index. After this, the processing returns to S2102.

If the input signal is not "Enter", the processing returns to S2106.

As described above, in the present embodiment the display image information, which conventionally would have had to have been generated by the data receiving apparatus 150 while the data receiving apparatus 150 is interpreting the control information, is generated and transmitted by the data transmitting apparatus 110, which reduces the load of each data receiving apparatus 150. Also, when compared with the large number and variety of display control processes for display character strings which were conventionally written into the control information, the link information of the present embodiment contains a smaller number and less variety of control processes. As a result, simulated bidirectional communication can be easily achieved by the data receiving apparatuses 150 using this link information.

The present embodiment describes the case when in order to display WWW home pages on the Internet, the data communication system 100 uses a one-to-many TV broadcast to is perform simulated bidirectional communication, so that when compared to the case when home pages are displayed by a browser on a personal computer, the display of the user's desired pages on the display unit 154 can be performed at a high speed which is unaffected by congestion. Since display image information is sent in a conventional TV format, the display of full color, high-resolution images can easily be achieved by the display unit 154. Also, while the display or display images generated by a browser for display on a TV monitor does not make full use of the components, such as the reproduction processing for display images, conventionally provided inside a TV, the present embodiment can achieve simulated bidirectional communication which makes full use of circuitry, such as memory and decoders, conventionally provided inside a TV set.

In the present embodiment, while the information to be obtained has been described as HTML documents which are used on the WWW together with compressed image information in GIF format and audio information in AU format, information expressed in other formats or languages, such as HyperCards, can be used. In such case, the processing for "<A>" tags refer to a method for conversion for the corresponding format and language. The present embodiment also describes the conversion of an HTML document containing only a limited number of tags, although other HTML tags may also be included.

The present embodiment also describes an example where the control for simulated bidirectional communication performed according to the link information is the switching of the display to another display image, although other processes, such as a process for flashing display on the screen, a process for scrolling the display image, or a process for activating a device such as a fax, telephone, or video recorder connected to the data receiving apparatus, may be performed in addition to simulated bidirectional communication.

The data communication system 100 is also described as having identification numbers of files written into the link information by the transmission data generating unit 112, although this process need not to be performed. As one alternative, the original file name may be written into the link information as the file identification number. When doing so, the file name can be attached to the display image information (including audio information) and link information in each set of transmission data during transmission, with the data receiving apparatus 150 which receives this information successively obtaining a complete act of link information after being switched on, so that it can then investigate the correspondence between file names and identification numbers.

The data receiving apparatus 150 may also store a complete set of display image information and link information which are repeatedly transmitted by the data transmitting apparatus 110 in the received data holding unit 152.

When the transport stream shown in FIG. 11B is transmitted from the data transmitting apparatus 110, the receiving apparatus 150 may first have the separating unit 151 separate and obtain the PMT, before reading the PMT to find the PID or the display image information to be obtained and having the display image information separated and obtained front the transport stream with the read PID as a filter condition. It may also read the PID of the private stream including the link information from the PMT, and then separate and obtain the link information from the transport stream with the PID and the identification number (table ID extension) as the filter conditions.

The transport stream shown in FIG. 11B was also described as having a video elementary stream made up of I pictures, although the video elementary stream may include B pictures and P Pictures. The display image information was also described as being encoded according to MPEG2 standard, although it may alternatively be encoded under another standard, such as MPEG1, JPEG, or GIF. Finally, the display image information and audio information were described as being transmitted as a video elementary stream and an audio elementary stream, although they may be multiplexed as private sections in the same way as the link information.

Second Embodiment

Figure 22:
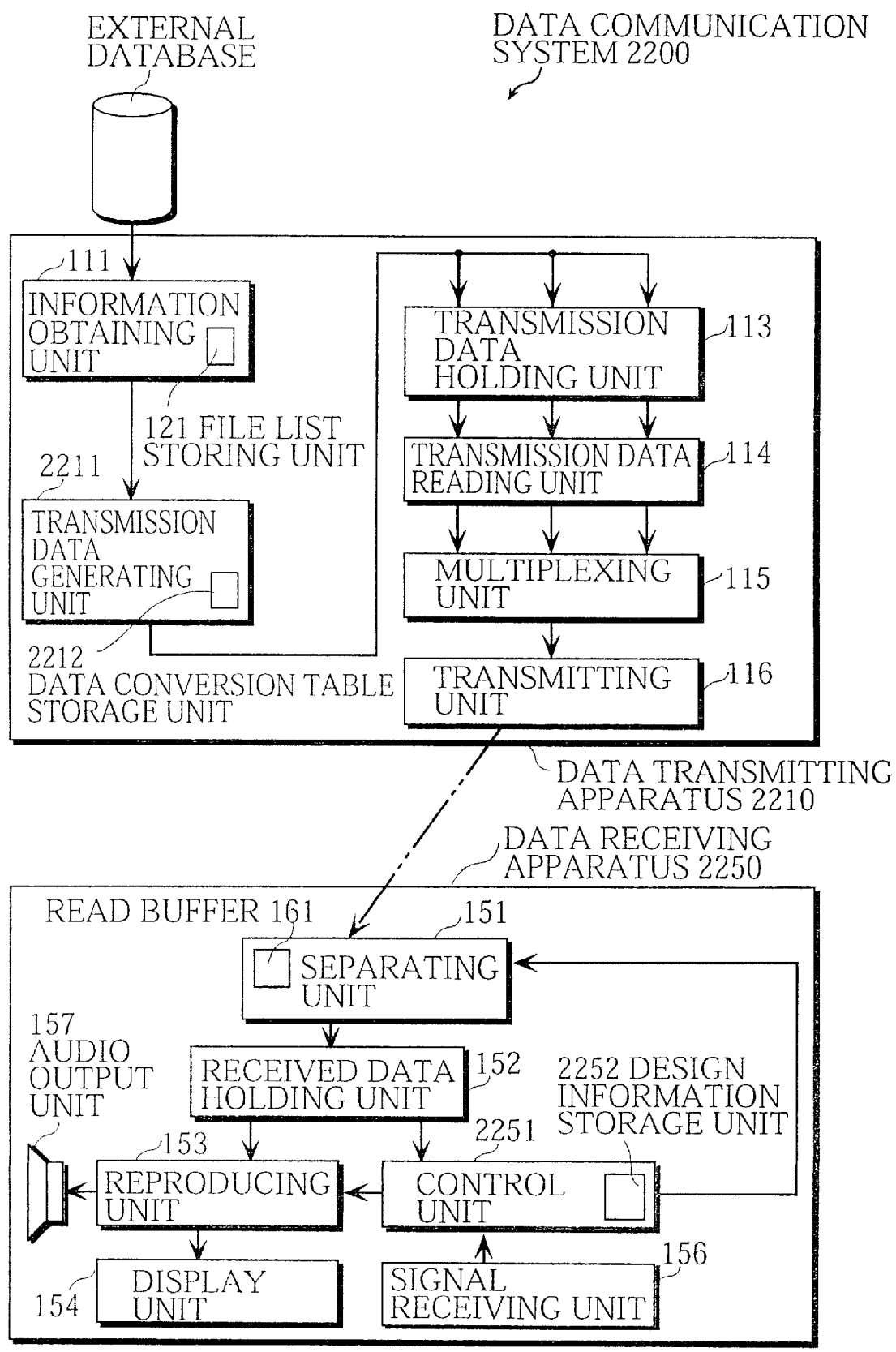
FIG. 22 is a block diagram showing the construction of the data communication system of the second embodiment of the present invention.

FIG. 22 is a block diagram showing the construction of the data communication system 2200 of the second embodiment is of the present invention. It should be noted here that components which are the same as the first embodiment have been given the same reference numerals and will not be explained.

The data communication system 2200 includes a data transmitting apparatus 2210 and a data receiving apparatus 2250.

The data transmitting apparatus 2210 is equipped with a transmission data generating unit 2211, in place of the transmission data generating unit 112 of the data transmitting unit 110.

Each data receiving unit 2250 in equipped with a control unit 2251 in place of the control unit 155. This control unit 2251 includes a design information storing unit 2252.

Data Transmitting Apparatus 2210

The transmission data generating unit 2211 is equipped with a data conversion table storing unit 2212 in place of the data conversion table storing unit 122, although, with the exception of the link information table, the stored content of the data conversion table storing unit 2212 is the same as the data conversion table storing unit 122.

FIG. 23 shows an example of the link information table 2300 which is the stored content of the data conversion table storing unit 2212.

In addition to the index information 701 and the hot spot information 702, the link information table 2300 also shows the format of the title information 2301.

The title information 2301 is composed of an information identification part "TITLE" identifying the present information as title information, X-Y coordinates "X=999, Y=999" showing the title display position in the display screen in which the corresponding display image information is to be displayed, and a number of pixels "L=999" which expresses the length of the title character string on the display screen. Here, the title Character string length is expressed as a number of pixels, although it may alternatively be expressed as a number of characters.

The transmission data generating unit 2211 generates title information indicating the composition of the title supplementary design in accordance with the link information table in the data conversion table storing unit 2212, in addition to the processes performed by the transmission data generating unit 112.

The following is a detailed description of the generation process for title information performed by the transmission data generating unit 2211, using the HTML document 301 shown in FIG. 3. Note that the initial display position which is set for each page in a WWW home page is (20,20).

After generating the index information from the file name or the HTML document 301, the transmission data generating unit 2211 interprets the tag "<HTML>" on line 311 and identifies that this is the first line of the HTML document 301. Following this, it deletes the character string "HTML" in the tag storage area.

Next, the transmission data generating unit 2211 reads the tag "<H1>" on line 312, looks up the tag "<H1>" in the tag table, and sets the headline flag in the flag storage area of the work area.

Since the headline flag is set in the flag storage area, the transmission data generating unit 2211 generates title information and, in the same way as the transmission data generating unit 112, converts the character string "WEATHER REPORT" between the tag "<H1>" and "</H1>" into image information using the H1 headline font to generate display image information.

More specifically, the transmission data generating unit 2211 refers to the link information table 2300 and finds the format of title information 2301. In the present case, this format is "<TITLE X=999, Y=999, L=999>", of which "X=999, Y=999" are the X-Y coordinates of the display position of the title. The display position of the title "WEATHER REPORT" which is given between the "<H1>" tags in the HTML document 301 is the coordinate position (20,20). Here, "L=999" shows the length of this character string. Since this character string is fourteen characters long, if the dimensions of each character in the H1 headline font are (10,10), the length L of this character string will be "140". As a result, the transmission data generating unit 2211 will generate the title information "<TITLE X=020, Y=020, L=140>" and add it to the link information storage area of the transmission data holding unit 113. The processes performed after this are the same as the transmission data generating unit 112, and so will not be explained.

Figures 24A, 24B, 24C:
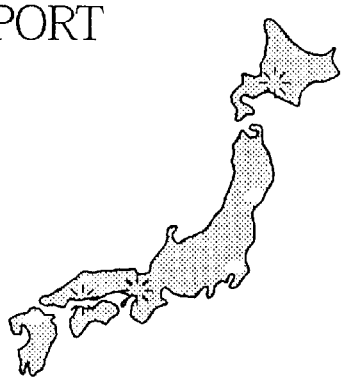
FIGS. 24A to 24C shows the transmission data for the first page of a WWW home page which has been generated from a HTML document and the audio information "Weather.au" according to the second embodiment.

FIGS. 24A, 24B, and 24C show the transmission data 2400 for the first page of the WWW home page which is generated from the HTML document 301, the audio information "Weather.au", and the image information 401. This transmission data 2400 is composed of display image information 801, the audio information 802, and the link information 2401. The content of FIGS. 24A and 24B is the same as FIGS. 8A and 8B, while FIG. 24C shows the content of the link information 2401 which differs from FIG. 8C.

As shown in FIG. 24C, the link information 2401 includes title information which is written on line 2412 after the index information on line 2411. Following this, the hot spot information is written on lines 2413 and 2414. This hot spot information is the same as the hot spot information on lines 912 and 813 of the link information 803 given in FIG. 8C.

Figure 25:
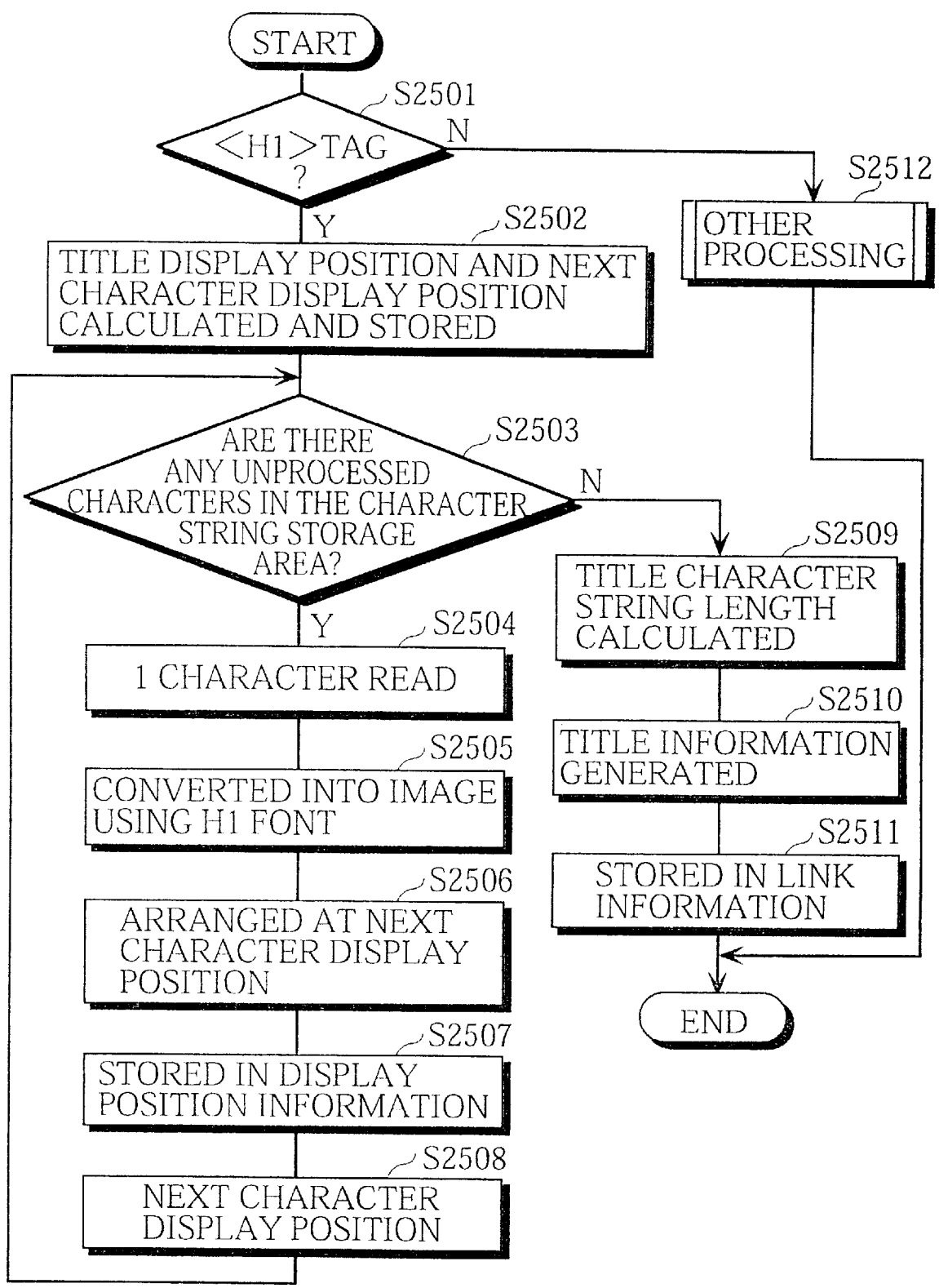
FIG. 25 is a flowchart showing an example of the processing by the transmission data generating unit for an "<H1>" tag in the second embodiment.

FIG. 25 is a flowchart for an example of the procedure of the transmission data generating unit 2411 for an "<H1>" tag.

In step S1408 shown in FIG. 15, the transmission data generating unit 2211 checks whether the tag is an "<H1>" tag (step S2501), and it not, the processing advances to step S2512.

If the tag is an "<H1>" tag, the transmission data generating unit 2211 sets the headline flag, calculates the coordinates of the title display position, and stores the calculated value in the appropriate registers as the title display position and as the next character display position (step S2502).

The transmission data generating unit 2211 then checks whether a character string is being stored in the character string storage area (S2503) and if not, the processing advances to step S2509. If a character string is being stored in the character string storage area, the transmission data generating unit 2211 reads one character from the character string storage area and deletes the character from the character string storage area (step S2504). The transmission data generating unit 2211 then converts the character into an image using the H1 headline font (step S2505). Following this, the transmission data generating unit 2211 arranges the character image at the next character display position and generates display image information (step S2506). After adding the generated display image information to the display image information storage area (step S2507), the next character display position is updated in accordance with the character size of the M1 headline font (step S2508), before the processing returns to step S2503.

Since all of the character strings in the character string storage area have been converted into images, the transmission data generating unit 2211 calculates the title character string length by Subtracting the coordinate value of the title display position from the coordinate position of the next character display position (step S2509). Next, the transmission data generating unit 2211 generates the title information from the title character string length and the coordinates of the title display position, in accordance with the format of the title information 2301 of the link information table 2300 (step S2510), and adds the generated title information to the link information storage area (step S2511). It then processes the other tags as before (step S2512).

Data Receiving Apparatus 2250

In addition to the processes of the control unit 155, the control unit 2251 outputs the title supplementary design stored in the design information storing unit 2252 to the reproducing unit 153 together with the X-Y coordinates showing the display position and the title character string length, in accordance with the title information in the link information. When doing 50, the control unit 2251 instructs the reproducing unit 153 to reproduce the title supplementary design in the current display screen. As one example, the control unit 2251 may read and store the X-Y coordinates showing the display position for the title supplementary design and the title character string length from the title information every time new link information is stored in the received data holding unit 152. Additionally, after instructing the reproducing unit 153 to reproduce the display image information, the control unit 2251 reads the title supplementary design from the design information storing unit 2252 and outputs the read information together with the display position (X-Y coordinates) for the title supplementary design and the title character string length to the reproducing unit 153. The control unit 2251 then indicates that the length of the title supplementary design should be set in accordance with the title character string length and that the title supplementary design should be combined with the display image for the display image information at the appropriate X-Y coordinates. This processing is performed between step S2104 and step S2105 in FIG. 21.

The design information storing unit 2252 stores title supplementary designs, in addition to the cursor designs.

Figures 26, 27:
FIG. 26 shows an example of the stored content of the design information storage unit in the second embodiment.
FIG. 27 shows the display image for the first screen which is displayed in accordance with the transmission data shown in FIGS. 24A to 24C.

FIG. 26 shows an example of the stored content of the design information storing unit 2252.

The design information storing unit 2252 stores cursor designs 2601 for the non-selection state, cursor designs 2602 for the selection state, and title supplementary designs 2603.

The cursor designs 2601 are read by the control unit 2251 after referring to the cursor design correspondence table, and are displayed at the display positions which are not indicated by the cursor number given in the variable Cur-Pos.

One of the cursor designs 2602 is also read by the control unit 2251, having referred to the cursor design correspondence table, and is displayed at the display position which is indicated by the cursor number given in the variable Cur-Pos.

As shown in FIG. 26, the title supplementary design 2603 is stored with its height having been set beforehand to correspond to the size of the H1 headline font, so that by adjusting their length in accordance with the title character string length and displaying the design 2603 superimposed at the display position of the character images of the H1 headline font, the text image displayed using the H1 headline font will be surrounded by a dotted line. This title supplementary design 2603 is read in accordance with the information identification part "TITLE" in the title information.

FIG. 27 shows the display screen 2700 for the first screen which is displayed in accordance with the transmission data 2400 shown in FIGS. 24A, 24B, and 24C.

As shown in FIG. 27, a text image for "WEATHER REPORT" which is the title and which has a title character string length of "140" is displayed at the title display position (20,20) in the display screen 2700. This text image is displayed surrounded by the title supplementary design 2701 stored in the design information storing unit 2252.

The cursor design 2702 for "HOTSPOT2" is displayed at the display position shown by the display position for the cursor number shown ill initial set value or the variable Cur-Pos. The cursor design 2703 for "HOTSPOT1" is displayed at the other cursor display position.

In addition to the effect of the data communication system 100 of the first embodiment, the data communication system 2200 of the present embodiment enables the data receiving apparatus 2250 to display a unique title supplementary design on its display screen without a significant increase in the load or the data receiving apparatus 2250.

There is a further benefit in that with the present embodiment, the data communication apparatus 2200 indicates the display positions of the cursor designs in the hot spot information, with the data receiving apparatus 2250 displaying cursor designs which it stores beforehand, so that the control for the display of cursor designs is performed at the receiver's end. As a result, the data transmitting apparatus 2210 no longer needs to transmit the same content of display image information just to express a change in the selection state or non-selection state of cursor designs, thereby improving the efficiency of information transfer for the display image information.

By storing design information for different designs in different models of data receiving apparatuses 2250, for example, it becomes possible to customize the cursor designs for each model of data receiving apparatus 2250. These customized designs can then be displayed to draw the user's attention to important display items on the screen. Since a plurality of sets of design information can be stored in the data receiving apparatus, the user may select a desired set of cursors and have them displayed.

It should be noted that the cursor design and the title supplementary design shown in FIG. 26 may be expressed as bitmap data which is a grouping of pixels, or as vector graphics data which is composed of coordinate data showing the display positions of the lines which fundamentally compose the design.

Third Embodiment

FIG. 28 is a block diagram showing the construction of the data communication system 3200 of the third embodiment of the present invention. It should be noted that components which are the same as the data communication system 2200 shown in FIG. 22 have been given the same reference numerals and will not be explained.

The data communication system 3200 is composed of a data transmitting apparatus 3210 and a data receiving apparatus 3250.

The data transmitting apparatus 3210 is equipped with a supplementary design adding unit 3211, in addition to the construction of the data transmitting apparatus 2210.

The data receiving apparatus 3250 is equipped with a supplementary design obtaining unit 3253, in addition to the construction of the data receiving apparatus 2250.

The design information stored in FIG. 26 is stored in an external database.

Supplementary Design Adding Unit 3211

The supplementary design adding unit 3211 reads the design information shown in FIG. 26 from an external database, and adds the read design information to the link information stored in the transmitted data holding unit 113.

Figures 29A, 29B, 29C:
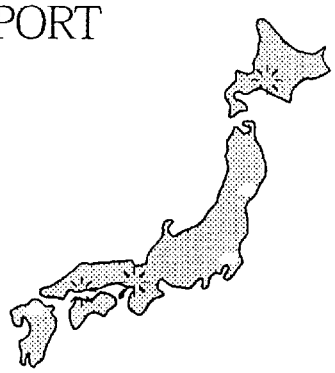
FIGS. 29A to 29C shows the transmission data for the first page of a WWW home page which has been generated from a HTML document and the audio information "Weather.au" according to the third embodiment.

FIGS. 29A to 29C show the transmission data 3400 which includes the link information 3401 to which the design information shown in FIG. 26 has been added. This transmission data 3400 is composed of display image information 801, audio information 802, and link information 3401. FIGS. 29A and 29B correspond to FIGS. 24A and 24B. FIG. 29C, meanwhile, shows the content of the link information 3401.

As shown in FIG. 29C, index information is written on line 3411 of link information 3401, title information is written on line 3412, and hot spot information is written on lines 3413 and 3414. Following this, design information 3415 is given.

Supplementary design obtaining unit 3253

The supplementary design obtaining unit 3253 obtains only the design information from the link information stored in the received data holding unit 152 and stores it in the design information storing unit 2252 provided in the control unit 2251. Following this, the supplementary design obtaining unit 3253 deletes the design information from the link information stored in the transmitted data holding unit 152.

In addition to the effects of the data communication system 2200, the data communication system 3200 of the present embodiment has the data transmitting apparatus 3210 transmit design information obtained from an external database to the data receiving apparatus 3250, so that the supplementary designs stored by the data receiving apparatus can be updated using a variety of different designs.

Although the present invention has been fully described by way of examples with reference to accompanying drawings, it is to be rioted that various changes and modifications will be apparent to those skilled in the art. Therefore, unless such changes and modifications depart from the scope of the present invention, they should be construed as being included therein.

What is claimed is:

1. A communication system, including a transmitting apparatus and a receiving apparatus, for achieving interactivity using a broadcast wave, the transmitting apparatus comprising:

supplementary design storing means for storing supplementary designs beforehand, storing means for storing a background image that is main image data to be displayed by the receiving apparatus and position information that indicates a position within the background image; and transmitting means for reading the supplementary designs, the background image, and the position information, and for multiplexing and repeatedly transmitting the read supplementary designs, the read background image, and the read position information, the receiving apparatus comprising:

separating means for separating the supplementary designs, the background image, and the position information from the repeatedly transmitted multiplexed supplementary designs, background image, and position information;

combining means for combining the separated background image and at least one separated supplementary design at a position indicated by the separated position information to generate image data; and reproducing means for reproducing the generated image data and outputting an image signal.

2. A communication system, including a transmitting apparatus and a receiving apparatus, for achieving interactivity using a broadcast wave, the transmitting apparatus comprising:

supplementary design storing means for storing supplementary designs beforehand, first storing means for storing a plurality of background images that are main image data to be displayed by the receiving apparatus and a plurality of sets of control information, each set of control information including image link information and supplementary design combining information, the image link information showing a link from one background image to another background image, and the supplementary design combining information indicating a combining of at least one supplementary design with a background image; and transmitting means for reading the plurality of supplementary designs, the plurality of background images, and the plurality of sets of control information, and for multiplexing and repeatedly transmitting the read supplementary designs, the read plurality of background images, and the plurality of sets of control information, the receiving apparatus comprising:

separating means for separating the supplementary designs, one background image, and the set of control information corresponding to the one background image from the repeatedly transmitted multiplexed supplementary designs, background images, and sets of control information;

combining means for combining the separated background image and at least one separated supplementary design, based on the supplementary design combining information included in the separated set of control information, to generate image data; second storing means for storing the generated image data and the separated set of control information; reproducing means for reproducing the generated image data and outputting an image signal;

operation means for receiving a user operation that indicates a switching of image data; and control means for controlling the separating means, in response to a user operation, to separate a background image that is indicated by the image link information included in the set of control information stored by the second storing means.

3. A communication system, including a transmitting apparatus and a receiving apparatus, for achieving interactivity using a broadcast wave, the transmitting apparatus comprising:

supplementary design storing means for storing supplementary designs beforehand, the supplementary designs including at least one cursor image;

first storing means for storing a plurality of background images that are main image data to be displayed by the receiving apparatus and a plurality of sets of control information, each set of control information including image link information and supplementary design combining information, the image link information showing a link from one background image to another background image, and the supplementary design combining information indicating a combining of at least one supplementary design with a background image; and transmitting means for reading the plurality of supplementary designs, the plurality of background images, and the plurality of sets of control information, and for multiplexing and repeatedly transmitting the read supplementary designs, the plurality of background images, and the plurality of sets of control information, the receiving apparatus comprising:

separating means for separating the supplementary designs, one background image, and the set of control information corresponding to the one background image from the repeatedly transmitted multiplexed supplementary designs, background images, and sets of control information; combining means for combining the separated background image and at least one separated supplementary design, based on the supplementary design combining information included in the separated set of control information, to generate image data;

second storing means for storing the generated image data and the separated set of control information; reproducing means for reproducing the generated image data and outputting an image signal;

operation means for receiving a user operation that indicates a switching of image data; and control means for controlling the separating means, in response to a user operation, to separate a background image that is indicated by the image link information included in the set of control information stored by the second storing means.

4. A communication system, including a transmitting apparatus and a receiving apparatus, for achieving interactivity using a broadcast wave, the transmitting apparatus comprising:

supplementary design storing means for storing supplementary designs beforehand, the supplementary designs being two types of cursor images that respectively represent a selected and a non selected state;

first storing means for storing a plurality of background images that are main image data to be displayed by the receiving apparatus and a plurality of sets of control information, each set of control information including image link information and supplementary design combining information, the image link information showing a link from one background image to another background image, and the supplementary design combining information indicating a combining of at least one supplementary design with a background image; and transmitting means for reading the plurality of supplementary designs, the plurality of background images, and the plurality of sets of control information, and for multiplexing and repeatedly transmitting the read supplementary designs, the read plurality of background images, and the read plurality of sets of control information, the receiving apparatus comprising:

separating means for separating the supplementary designs, one background image, and the set of control information corresponding to the one background image from the repeatedly transmitted multiplexed supplementary designs, background images, and sets of control information;

combining means for combining the separated background image and at least one separated supplementary design, based on the supplementary design combining information included in the separated set of control information, to generate image data;

second storing means for storing the generated image data and the separated set of control information;

reproducing means for reproducing the generated image data and outputting an image signal;

operation means for receiving a user operation that indicates a switching of image data; and control means for controlling the separating means, in response to a user operation, to separate a background image that is indicated by the image link information included in the set of control information stored by the second storing means.

5. A communication system, including a transmitting apparatus and a receiving apparatus, for achieving interactivity using a broadcast wave, the transmitting apparatus comprising:

supplementary design storing means for storing supplementary designs beforehand;

first storing means for storing a plurality of background images that are main image data to be displayed by the receiving apparatus and a plurality of sets of control information, each set of control information including image link information and supplementary design combining information, the image link information showing a link from one background image to another background image, and the supplementary design combining information indicating a combining of at least one supplementary design with a it background image; and transmitting means for reading the plurality of supplementary designs, the plurality of background images, and the plurality of sets of control information, and for multiplexing and repeatedly transmitting the read supplementary designs, the read plurality of background images, and the read plurality of sets of control information, the receiving apparatus comprising:

separating means for separating the supplementary designs, one background image, and the set of control information corresponding to the one background image from the repeatedly transmitted multiplexed supplementary designs, background images, and sets of control information;

combining means for combining, based on the supplementary design combining information included in the separated set of control information, at least one separated supplementary design with the separated background image at a position indicated by the supplementary combining information to generate image data;

second storing means for storing the generated image data and the separated set of control information;

reproducing means for reproducing the generated image data and outputting an image signal;

operation means for receiving a user operation that indicates a switching of image data; and control means for controlling the separating means, in response to a user operation, to separate a background image that is indicated by the image link information included in the set of control information stored by the second storing means.

6. A transmitting apparatus for use in a communication system that achieves interactivity using a broadcast wave, the transmitting apparatus comprising:

supplementary design storing means for storing supplementary designs beforehand, the supplementary designs being combined with main image data and displayed by a receiving apparatus, and transmitting means for reading the supplementary designs and repeatedly transmitting the supplementary designs; and storing means for storing a background image that is main image data to be displayed by the receiving apparatus, the transmitting means reading the background image from the storing means, multiplexing the read supplementary designs and background image, and repeatedly transmitting the multiplexed background image and supplementary designs;

obtaining means for obtaining page information from the World Wide Web on the Internet, the page information representing a page that is an arrangement of characters and images and including character information, image information, and link information showing a link to another page; and generating means for generating a background image that corresponds to a frame including characters and images, based on the character information and images information in the obtained page information.

7. A transmitting apparatus for use in a communication system that achieves interactivity using a broadcast wave, the transmitting apparatus comprising:

supplementary design storing means for storing supplementary designs beforehand, the supplementary designs being combined with main image data and displayed by a receiving apparatus, and transmitting means for reading the supplementary designs and repeatedly transmitting the supplementary designs wherein the supplementary designs are figures that give a bold display of headings; and storing means for storing a background image that is main image data to be displayed by the receiving apparatus, the transmitting means reading the background image from the storing means, multiplexing the read supplementary designs and background image, and repeatedly transmitting the multiplexed background image and supplementary designs.

8. A transmitting apparatus for use in a communication system that achieves interactivity using a broadcast wave, the transmitting apparatus comprising:

supplementary design storing means for storing supplementary designs beforehand, the supplementary designs being combined with main image data and displayed by a receiving apparatus, and transmitting means for reading the supplementary designs and repeatedly transmitting the supplementary designs; and storing means for storing a background image that is main image data to be displayed by the receiving apparatus, the transmitting means reading the background image from the storing means, multiplexing the read supplementary designs and background image, and repeatedly transmitting the multiplexed background image and supplementary designs, wherein the storage means further stores region information, the region information indicating a region in the background image, the supplementary designs being combined with the region in the background image, the transmitting means reading the region information, multiplexing the read region information with the read supplementary designs and read background information, and repeatedly transmitting a result of the multiplexing.

9. A transmitting apparatus for use in a communication system that achieves interactivity using a broadcast wave, the transmitting apparatus comprising:

supplementary design storing means for storing supplementary designs beforehand, the supplementary designs being combined with main image data and displayed by a receiving apparatus, and transmitting means for reading the supplementary designs and repeatedly transmitting the supplementary designs; and storing means for storing a background image that is main image data to be displayed by the receiving apparatus, the transmitting means reading the background image from the storing means, multiplexing the read supplementary designs and background image, and repeatedly transmitting the multiplexed background image and supplementary designs, wherein the storage means further stores a classification for a specific part of an image, the classification corresponding to a specific supplementary design, the transmitting means reading the classification, multiplexing the read classification with the read supplementary designs and read background information, and repeatedly transmitting a result of the multiplexing.

10. The transmitting apparatus of claim 9, wherein the classification for a specific part of an image is for one of a character and image that is linked to another background image.

11. The transmitting apparatus of claim 9, wherein the classification for a specific part of an image is for a heading.

12. A transmitting apparatus for use in a communication system that achieves interactivity using a broadcast wave, the transmitting apparatus comprising:

supplementary design storing means for storing supplementary designs beforehand;

storing means for storing a background image that is main image data to be displayed by a receiving apparatus and position information that shows a position within the background image, the receiving apparatus combining at least one supplementary design with the background image at the position indicated by the position information; and transmitting means for reading the supplementary designs, the position information, and the background image, and for multiplexing and repeatedly transmitting the read supplementary designs, position information, and background image.

13. The transmitting apparatus of claim 12, wherein the position information includes an X coordinate and a Y coordinate that indicate the position in the background image, the receiving apparatus combining at least one supplementary design with the background image at the position indicated by the X coordinate and the Y coordinate in the position information.

14. A transmitting apparatus for use in a communication system that achieves interactivity using a broadcast wave, the transmitting apparatus comprising:

supplementary design storing means for storing supplementary designs beforehand, the supplementary designs being combined with main image data and displayed by a receiving apparatus;

storing means for storing a plurality of background images that are main image data to be displayed by the receiving apparatus and a plurality of sets of control information, each set of control information including image link information and supplementary design combining information, the image link information showing a link from one background image to another background image, and the supplementary design combining information indicating a combining of at least one supplementary design with a background image; and transmitting means for reading the plurality of supplementary designs, the plurality of background images, and the plurality of sets of control information, and for multiplexing and repeatedly transmitting the read supplementary designs, the read plurality of background;

the background image, the receiving apparatus combining at least one supplementary design with the background image at the position indicated by the X coordinate and the Y coordinate in the position information.

15. A transmitting apparatus for use in a communication system that achieves interactivity using a broadcast wave, the transmitting apparatus comprising:

supplementary design storing means for storing supplementary designs beforehand, the supplementary designs being combined with main image data and displayed by a receiving apparatus;

storing means for storing a plurality of background images that are main image data to be displayed by the receiving apparatus and a plurality of sets of control information, each set of control information including image link information and supplementary design combining information, the image link information showing a link from one background image to another background image, and the supplementary design combining information indicating a combining of at least one supplementary design with a background image; and transmitting means for reading the plurality of supplementary designs, the plurality of background images, and the plurality of sets of control information, and for multiplexing and repeatedly transmitting the read supplementary designs, the read plurality of background.

16. A transmitting apparatus for use in a communication system that achieves interactivity using a broadcast wave, the transmitting apparatus comprising:

supplementary design storing means for storing supplementary designs beforehand, the supplementary designs being combined with main image data and displayed by a receiving apparatus and the supplementary designs being two types of cursor images that respectively represent a selected and a non-selected state;

storing means for storing a plurality of background images that are main image data to be displayed by the receiving apparatus and a plurality of sets of control information, each set of control information including image link information and supplementary design combining information, the image link information showing a link from one background image to another background image, and the supplementary design combining information indicating a combining of at least one supplementary design with a background image; and transmitting means for reading the plurality of supplementary designs, the plurality of background images, and the plurality of sets of control information, and for multiplexing and repeatedly transmitting the read supplementary designs, the read plurality of background images, and the plurality of sets of control information.

17. A transmitting apparatus for use in a communication system that achieves interactivity using a broadcast wave, the transmitting apparatus comprising:

supplementary design storing means for storing supplementary designs beforehand, the supplementary designs being combined with main image data and displayed by a receiving apparatus;

storing means for storing a plurality of background images that are main image data to be displayed by the receiving apparatus and a plurality of sets of control information, each set of control information including image link information and supplementary design combining information, the image link information showing a link from one background image to another background image, and the supplementary design combining information indicating a combining of at least one supplementary design with a background image and including position information that indicates a position in a background image, the receiving apparatus combining at least one supplementary design at the position in the background image indicated by the position information; and transmitting means for reading the plurality of supplementary designs, the plurality of background images, and the plurality of sets of control information, and for multiplexing and repeatedly transmitting the read supplementary designs, the read plurality of background images, and the plurality of sets of control information.

18. A receiving apparatus for use in a communication system that achieves interactivity using a broadcast wave, wherein supplementary designs are repeatedly transmitted, the supplementary designs being combined with main image data and displayed by the receiving apparatus, the receiving apparatus comprising:

separating means for separating at least one supplementary design from repeatedly transmitted supplementary designs;

supplementary design storing means for storing the separated supplementary designs;

supplementary design reading means for reading a supplementary design from the supplementary design storing means;

combining means for combining the read supplementary design with the separated background image and generating image data; and reproduction means for reproducing the generated image data and outputting an image signal;

wherein the supplementary designs are repeatedly transmitted having been multiplexed with a background image, the background image being main image data to be displayed by the receiving apparatus, the separating means separating the supplementary designs and the background image from the repeatedly transmitted multiplexed supplementary designs and background image; and wherein the supplementary designs are repeatedly transmitted having been multiplexed with a background image and a classification of a specific image part, the classification corresponding to a specific supplementary design, the separating means separating the supplementary designs, the background image, and the classification from the repeatedly transmitted multiplexed supplementary designs, background image, and classification, and the supplementary design reading means reading a supplementary design that corresponds to the separated classification.

19. The receiving apparatus of claim 18, wherein the classification for a specific part of an image is for one of a character and image that is linked to another background image.

20. The receiving apparatus of claim 18, wherein the classification for a specific part of an image is for a heading.

21. A receiving apparatus for use in a communication system that achieves interactivity using a broadcast wave, wherein supplementary designs, a background image, and position information are multiplexed and repeatedly transmitted, the background image being main image data to be displayed by the receiving apparatus and the position information indicating a position in the background image, the receiving apparatus comprising:

separating means for separating the supplementary designs, the background image, and the position information from the repeatedly transmitted multiplexed supplementary designs, background image, and position information;

combining means for combining the separated background image and at least one separated supplementary design at the position indicated by the separated position information to generate image data; and reproducing means for reproducing the generated image data and outputting an image signal.

22. The receiving apparatus of claim 21, wherein the position information includes an X coordinate and a Y coordinate that indicate the position in the background image, the combining means combining at least one supplementary design with the background image at the position indicated by the X coordinate and the Y coordinate in the position information.

23. A receiving apparatus for use in a communication system that achieves interactivity using a broadcast wave, wherein a plurality of supplementary designs, a plurality of background images, and a plurality of sets of control information are multiplexed and repeatedly transmitted, each background image being main image data to be reproduced by the receiving apparatus, each set of control information corresponding to a different one of the background images and each set of control information including image link information and supplementary design combining information, the image link information showing a link from one background image to another background image, and the supplementary design combining information indicating a combining of at least one supplementary design with a background image, the receiving apparatus comprising:

separating means for separating the supplementary designs, one background image, and the set of control information corresponding to the one background image from the repeatedly transmitted multiplexed supplementary designs, background images, and sets of control information;

combining means for combining the separated background image and at least one separated supplementary design, based on the supplementary design combining information included in the separated set of control information, to generate image data;

storing means for storing the generated image data and the separated set of control information;

reproducing means for reproducing the generated image data and outputting an image signal;

operation means for receiving a user operation that indicates a switching of image data; and control means for controlling the separating means, in response to a user operation, to separate a background image that is indicated by the image link information included in the set of control information stored by the storing means.

24. A receiving apparatus for use in a communication system that achieves interactivity using a broadcast wave, wherein a plurality of supplementary designs, a plurality of background images, and a plurality of sets of control information are multiplexed and repeatedly transmitted, the plurality of supplementary designs including at least one cursor image, each background image being main image data to be reproduced by the receiving apparatus, each set of control information corresponding to a different one of the background images and each set of control information including image link information and supplementary design combining information, the image link information showing a link from one background image to another background image, and the supplementary design combining information indicating a combining of at least one supplementary design with a background image, the receiving apparatus comprising:
separating means for separating the supplementary designs, one background image, and the set of control information corresponding to the one background image from the repeatedly transmitted multiplexed supplementary designs, background images, and sets of control information;
combining means for combining the separated background image and at least one separated supplementary design, based on the supplementary design combining information included in the separated set of control information, to generate image data;
storing means for storing the generated image data and the separated set of control information;
reproducing means for reproducing the generated image data and outputting an image signal;
operation means for receiving a user operation that indicates a switching of image data; and control means for controlling the separating means, in response to a user operation, to separate a background image that is indicated by the image link information included in the set of control information stored by the storing means.

25. A receiving apparatus for use in a communication system that achieves interactivity using a broadcast wave, wherein a plurality of supplementary designs, a plurality of background images, and a plurality of sets of control information are multiplexed and repeatedly transmitted, the supplementary designs being two types of cursor images that respectively represent a selected and a non-selected state, each background image being main image data to be reproduced by the receiving apparatus, each set of control information corresponding to a different one of the background images and each set of control information including image link information and supplementary design combining information, the image link information showing a link from one background image to another background image, and the supplementary design combining information indicating a combining of at least one supplementary design with a background image, the receiving apparatus comprising:
separating means for separating the supplementary designs, one background image, and the set of control information corresponding to the one background image from the repeatedly transmitted multiplexed supplementary designs, background images, and sets of control information;
combining means for combining the separated background image and at least one separated supplementary design, based on the supplementary design combining information included in the separated set of control information, to generate image data;
storing means for storing the generated image data and the separated set of control information;

reproducing means for reproducing the generated image data and outputting an image signal;
operation means for receiving a user operation that indicates a switching of image data; and
control means for controlling the separating means, in response to a user operation, to separate a background image that is indicated by the image link information included in the set of control information stored by the storing means.

26. A receiving apparatus for use in a communication system that achieves interactivity using a broadcast wave, wherein a plurality of supplementary designs, a plurality of background images, and a plurality of sets of control information are multiplexed and repeatedly transmitted, each background image being main image data to be reproduced by the receiving apparatus, each set of control information corresponding to a different one of the background images and each set of control information including image link information and supplementary design combining information, the image link information showing a link from one background image to another background image, and the supplementary design combining information indicating a combining of at least one supplementary design with a background image and including position information that indicates a position in a background image,
the receiving apparatus comprising:
separating means for separating the supplementary designs, one background image, and the set of control information corresponding to the one background image from the repeatedly transmitted multiplexed supplementary designs, background images, and sets of control information;
combining means for combining, based on the supplementary design combining information included in the separated set of control information, the separated background image and at least one separated supplementary design at the position in the background image indicated by the position information included in the supplementary design combining information, to generate image data;
storing means for storing the generated image data and the separated set of control information;
reproducing means for reproducing the generated image data and outputting an image signal;
operation means for receiving a user operation that indicates a switching of image data; and
control means for controlling the separating means, in response to a user operation, to separate a background image that is indicated by the image link information included in the set of control information stored by the storing means.

27. A transmitting method for use by a transmitting apparatus in a communication system that achieves interactivity using a broadcast wave, the transmitting apparatus comprising;
supplementary design storing means for storing supplementary designs beforehand; and
storing means for storing a plurality of background images that are main image data to be displayed by the receiving apparatus and a plurality of sets of control information, each set of control information including image link information and supplementary design combining information, the image link information showing a link from one background image to another background image, and the supplementary design combining information indicating a combining of at least one supplementary design with a background image, the transmitting method comprising:
a transmitting step for reading the plurality of supplementary designs, the plurality of background images, and the plurality of sets of control information, and for multiplexing and repeatedly transmitting the read supplementary designs, the read plurality of background images, and the plurality of sets of control information.

28. A computer readable recording medium recording a receiving program for use by a receiving apparatus in a communication system that achieves interactivity using a broadcast wave, wherein supplementary designs, a background image, and position information are multiplexed and repeatedly transmitted, the background image being main image data to be displayed by the receiving apparatus and the position information indicating a position in the background image, the receiving program comprising: a separating step for separating the supplementary designs, the background image, and the position information from the repeatedly transmitted multiplexed supplementary designs, background image, and position information;
a combining step for combining the separated background image and at least one separated supplementary design at the position indicated by the separated position information to generate image data; and a reproducing step for reproducing the generated image data and outputting an image signal.

29. A computer readable recording medium recording a receiving program for use by a receiving apparatus in a communication system that achieves interactivity using a broadcast wave, wherein a plurality of supplementary designs, a plurality of background images, and a plurality of sets of control information are multiplexed and repeatedly transmitted to the receiving apparatus, each background image being main image data to be reproduced by the receiving apparatus, each set of control information including image link information and supplementary design combining information indicating a combining of at least one supplementary design with a background image,
the receiving program comprising:
a separated step for separating the supplementary designs, one background image, and the set of control information corresponding to the one background image from the repeatedly transmitted multiplexed supplementary designs, background images, and sets of control information;
a combining step for combining the separated background image and at least one separated supplementary design, based on the supplementary design combining information included in the separated set of control information, to generate image data;
a storing step for storing the generated image data and the separated set of control information;
a reproducing step for reproducing the generated image data and outputting an image signal;
an operation step for receiving a user operation that indicates a switching of image data; and
a control step for controlling the separating step, in response to a user operation, to separate a background image that is indicated by the image link information included in the set of control information stored by the storing step.

30. A computer readable recording medium recording a receiving program for use by a receiving apparatus in a communication system that achieves interactivity using a broadcast wave, wherein a plurality of supplementary designs, a plurality of background images, and a plurality of sets of control information are multiplexed and repeatedly transmitted to the receiving apparatus, the plurality of supplementary designs including at least one cursor image, each background image being main image data to be reproduced by the receiving apparatus, each set of control information corresponding to a different one of the background images and each set of control information including image link information and supplementary design combining information, the image link information showing a link from one background image to another background image, and the supplementary design combining information indicating a combining of at least one supplementary design with a background image,
the receiving program comprising:
a separating step for separating the supplementary designs, one background image, and the set of control information corresponding to the one background image from the repeatedly transmitted multiplexed supplementary designs, background images, and sets of control information;
a combining step for combining the separated background image and at least one separated supplementary design, based on the supplementary design combining information included in the separated set of control information, to generate image data;
a storing step for storing the generated image data and the separated set of control information;
a reproducing step for reproducing the generated image data and outputting an image signal;
an operation step for receiving a user operation that indicates a switching of image data; and
a control step for controlling the separating step, in response to a user operation, to separate a background image that is indicated by the image link information included in the set of control information stored by the storing step.

31. A computer readable recording medium recording a receiving program for use by a receiving apparatus in a communication system that achieves interactivity using a broadcast wave, wherein a plurality of supplementary designs, a plurality of background images, wherein a plurality of supplementary designs, a plurality of background images, and a plurality of sets of control information are multiplexed and repeatedly transmitted to the receiving apparatus, the supplementary designs being two types of cursor images that respectively represent a selected and a non-selected state, each background image being main image data to be reproduced by the receiving apparatus, each set of control information corresponding to a different one of the background images and each set of control information including image link information and supplementary design combining information, the image link information showing a link from one background image to another background image, and the supplementary design combining information indicating a combining of at least one supplementary design with a background image, the receiving program comprising: a separating step for separating the supplementary designs, one background image, and the set of control information corresponding to the one background image from the repeatedly transmitted multiplexed supplementary designs, background images, and sets of control information;
a combining step for combining the separated background image and at least one separated supplementary design, based on the supplementary design combining information included in the separated set of control information, to generate image data;

a storing step for storing the generated image data and the separated set of control information;

a reproducing step for reproducing the generated image data and outputting an image signal;

an operation step for receiving a user operation that indicates a switching of image data; and a control step for controlling the separating step, in response to a user operation, to separate a background image that is indicated by the image link information included in the set of control information stored by the storing step.

32. A computer readable recording medium recording a receiving program for use by a receiving apparatus in a communication system that achieves interactivity using a broadcast wave, wherein a plurality of supplementary designs, a plurality of background images, and a plurality of sets of control information are multiplexed and repeatedly transmitted, each background image being main image data to be reproduced by the receiving apparatus, each set of control information corresponding to a different one of the background images and each set of control information including image link information and supplementary design combining information, the image link information showing a link from one background image to another background image, and the supplementary design combining information indicating a combining of at least one supplementary design with a background image and including position information that indicates a position in a background image, the receiving program comprising: a separating step for separating the supplementary designs, one background image, and the set of control information corresponding to the one background image from the repeatedly transmitted multiplexed supplementary designs, background images, and sets of control information;

a combining step for combining, based on the supplementary design combining information included in the separated set off control information, the separated background image and at least one separated supplementary design at the position in the background image indicated by the position information included in the supplementary design combining information, to generate image data;

a storing step for storing the generated image data and the separated set of control information;

a reproducing step for reproducing the generated image data and outputting an image signal;

an operation step for receiving a user operation that indicates a switching of image data; and a control step for controlling the separating step, in response to a user operation, to separate a background image that is indicated by the image link information included in the set of control information stored by the storing step.

* * * * *